(12) United States Patent
Komaki et al.

(10) Patent No.: US 8,989,602 B2
(45) Date of Patent: Mar. 24, 2015

(54) DIGITAL COHERENT OPTICAL RECEIVER, ADAPTIVE EQUALIZER, AND DIGITAL COHERENT OPTICAL COMMUNICATION METHOD

(75) Inventors: Kosuke Komaki, Kawasaki (JP); Osamu Takeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 41 days.

(21) Appl. No.: 13/283,214

(22) Filed: Oct. 27, 2011

(65) Prior Publication Data

US 2012/0148266 A1 Jun. 14, 2012

(30) Foreign Application Priority Data

Dec. 9, 2010 (JP) ................................ 2010-274933

(51) Int. Cl.
| | |
|---|---|
| *H04B 10/06* | (2006.01) |
| *H04L 25/03* | (2006.01) |
| *H04B 10/61* | (2013.01) |

(52) U.S. Cl.
CPC ........ *H04L 25/03019* (2013.01); *H04B 10/611* (2013.01); *H04B 10/6166* (2013.01); *H04L 2025/0363* (2013.01)
USPC ........... 398/208; 398/202; 398/209; 398/210; 375/232

(58) Field of Classification Search
None
See application file for complete search history.

(56) References Cited

U.S. PATENT DOCUMENTS

| | | | | |
|---|---|---|---|---|
| 2006/0177220 | A1* | 8/2006 | Bulow | 398/25 |
| 2009/0214201 | A1* | 8/2009 | Oda et al. | 398/25 |
| 2009/0219983 | A1* | 9/2009 | Gerfers et al. | 375/232 |
| 2010/0003028 | A1 | 1/2010 | Zhang et al. | |
| 2011/0142449 | A1 | 6/2011 | Xie | |

FOREIGN PATENT DOCUMENTS

| | | |
|---|---|---|
| EP | 1139619 | 10/2001 |
| EP | 1693975 | 8/2006 |
| EP | 2 169 867 A1 | 3/2010 |
| JP | 2002-357509 | 12/2002 |
| JP | 2008-124893 | 5/2008 |
| JP | 2009-253972 | 10/2009 |
| JP | 2009-296596 | 12/2009 |
| JP | 2012-119759 | 6/2012 |
| WO | 2010/128577 A1 | 11/2010 |
| WO | 2012/133473 A1 | 10/2012 |

OTHER PUBLICATIONS

Ling Liu et al.; "Initial Tap Setup of Constant Modulus Algorithm for Polarization De-multiplexing in Optical Coherent Receivers"; Optical Fiber Communication Conference; 2009; pp. 2-4.

(Continued)

*Primary Examiner* — Ken Vanderpuye
*Assistant Examiner* — Merlin Brito Peguero
(74) *Attorney, Agent, or Firm* — Staas & Halsey LLP

(57) ABSTRACT

A digital coherent optical receiver includes a processor that is operative to separate electric signals obtained by converting an optical signal into a horizontal signal component and a vertical signal component; to generate a histogram of the horizontal signal component and the vertical signal component as outputs of the equalizing filter; and to determine a presence/absence of local convergence based on distribution of the histogram of the horizontal signal component and the histogram of the vertical signal component.

15 Claims, 21 Drawing Sheets

(56) References Cited

OTHER PUBLICATIONS

Extended European Search Report dated Jul. 25, 2012 issued in corresponding European Patent Application No. 11187077.0.

European Communication Pursuant to Article 94(3) EPC dated Mar. 4, 2013, issued in corresponding European Patent Application No. 11 187 077.0.

Japanese Office Action issued on Jul. 1, 2014 in corresponding Japanese Patent Application No. 2010-274933.

* cited by examiner

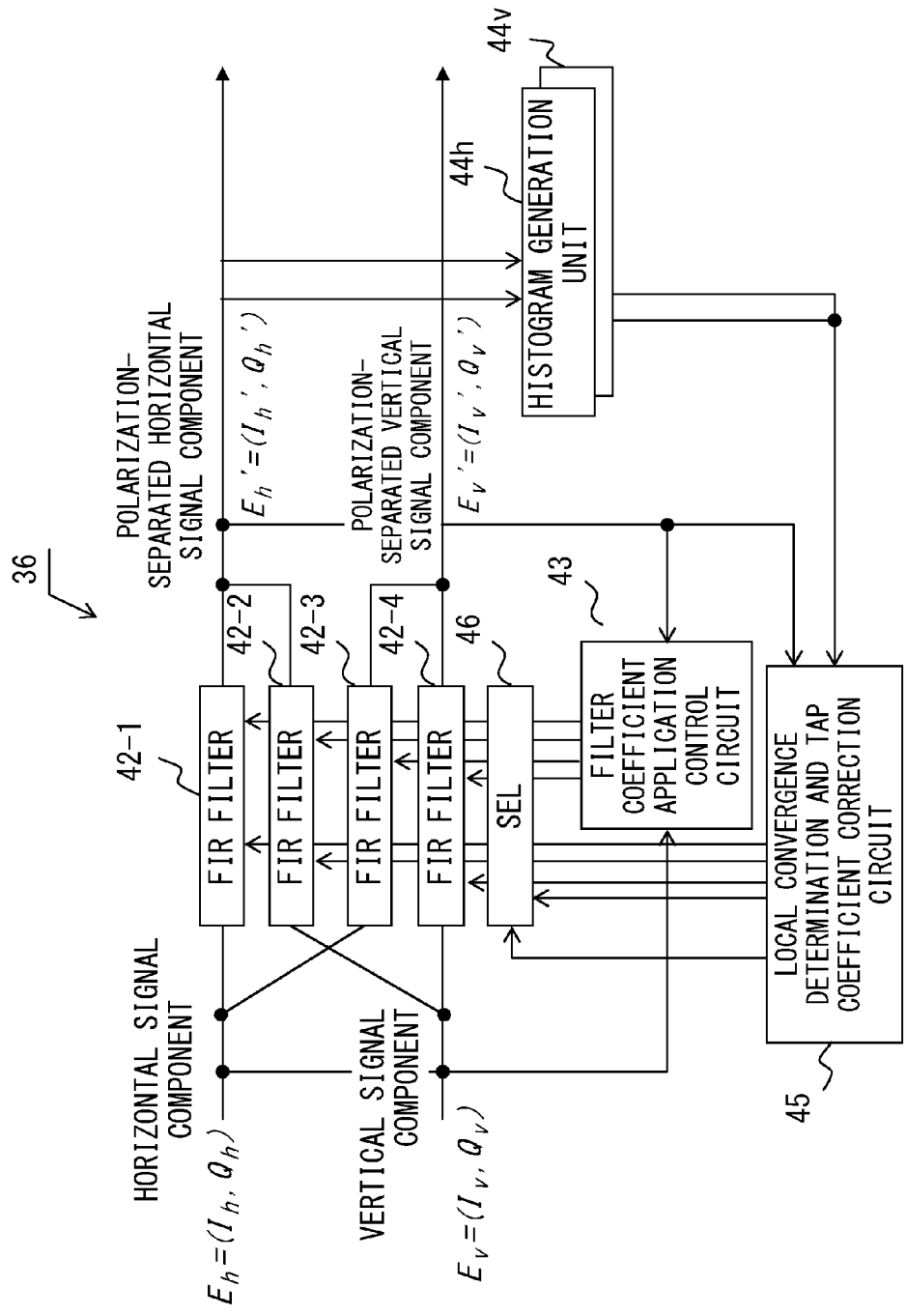
F I G. 5

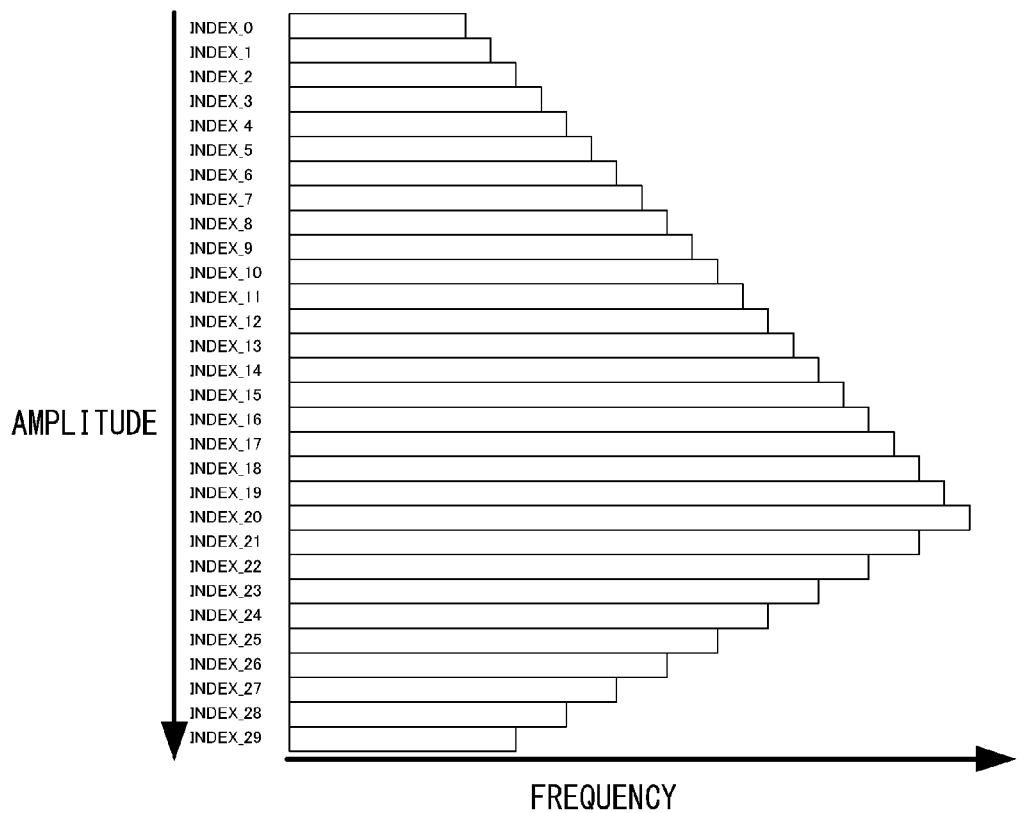
F I G. 6

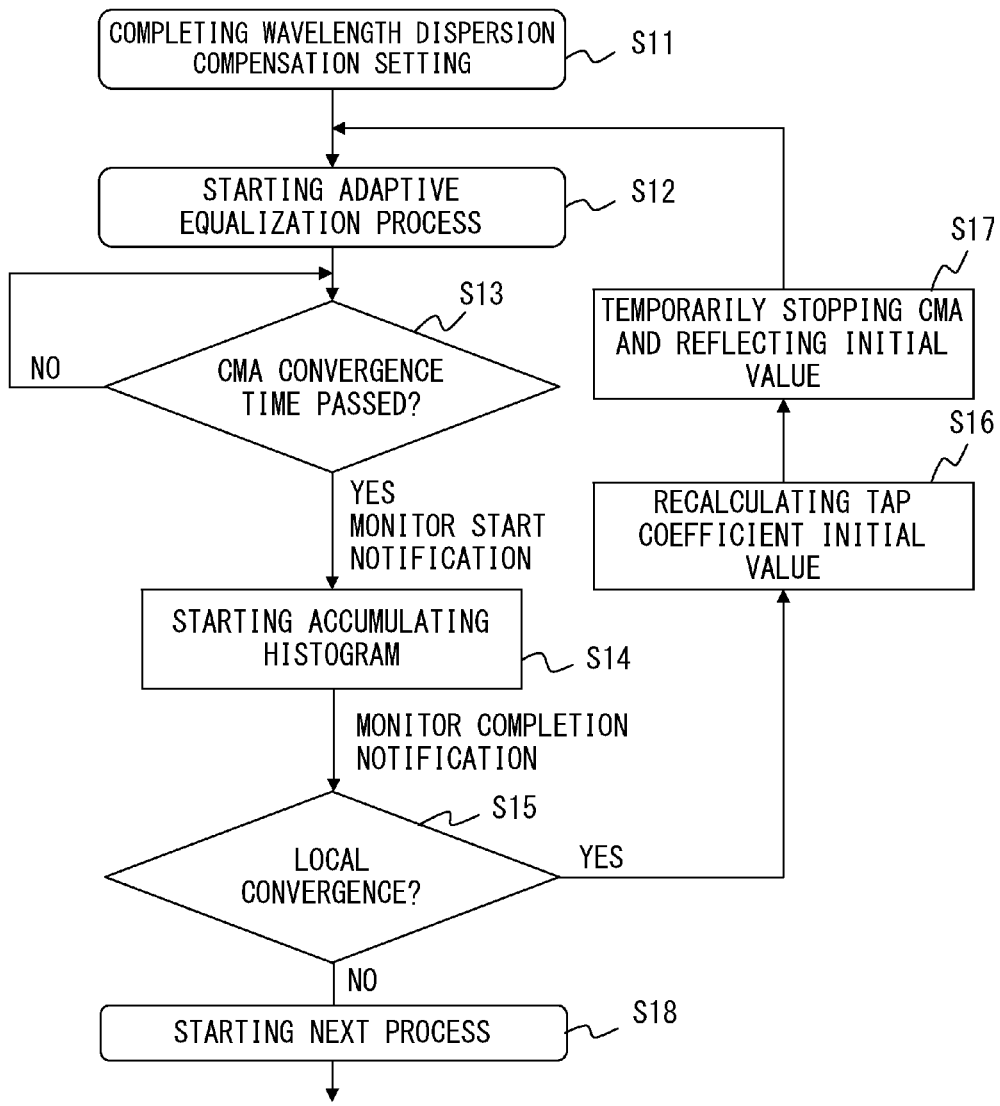
F I G. 7

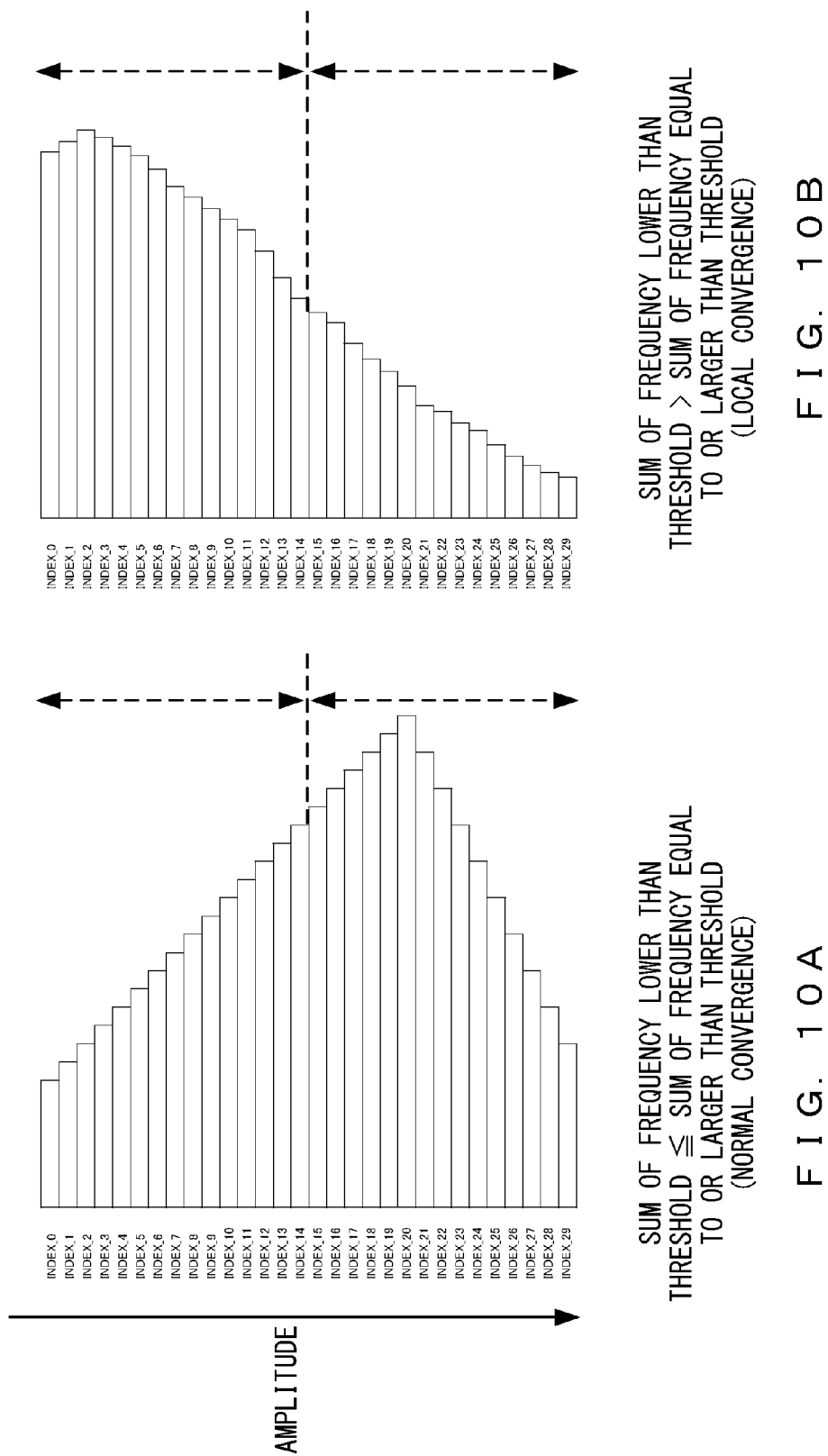

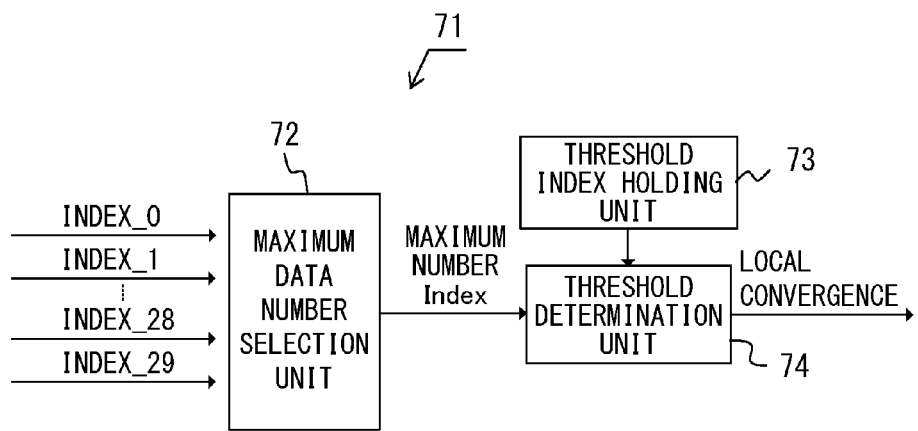
F I G. 1 1

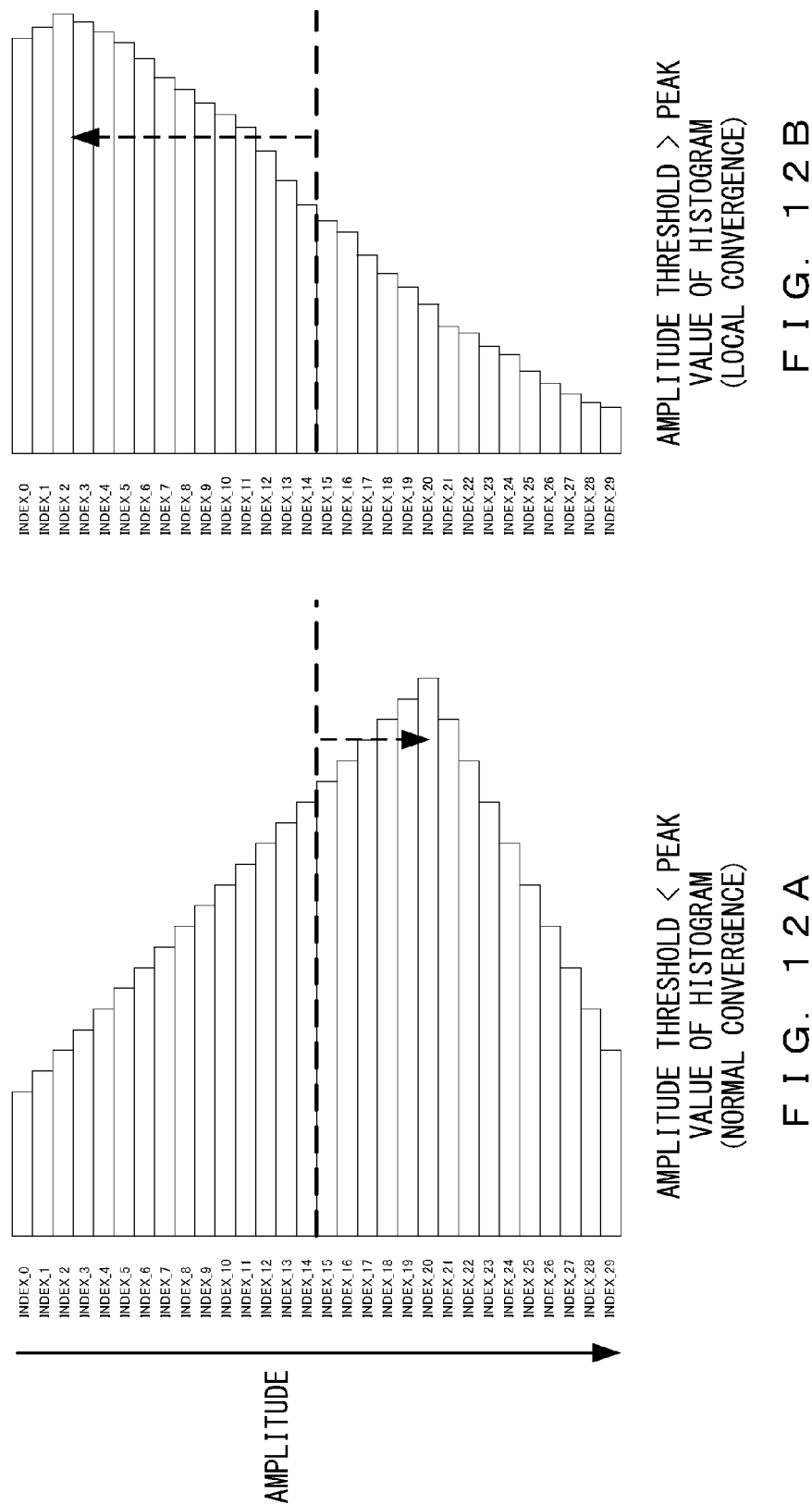

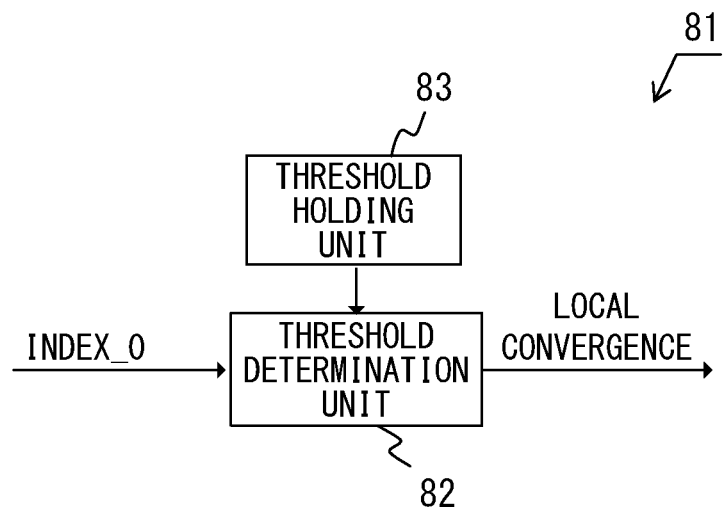
F I G. 1 3

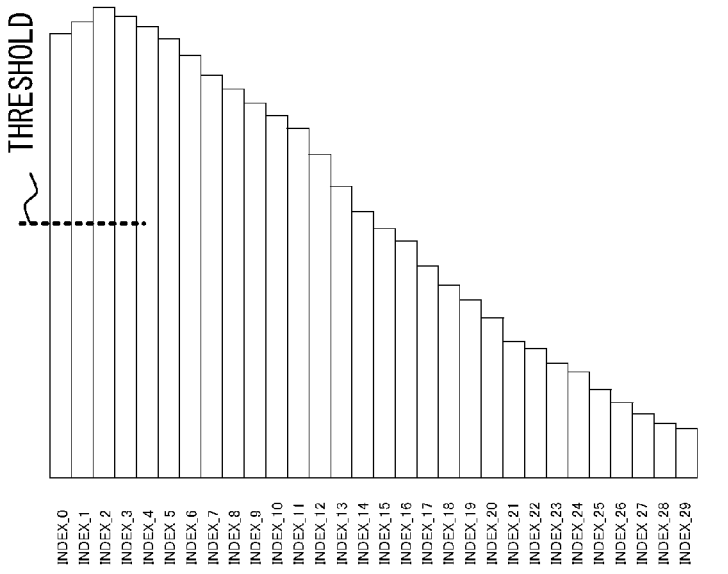
FREQUENCY OF AMPLITUDE 0 > FREQUENCY
THRESHOLD OF AMPLITUDE 0
(LOCAL CONVERGENCE)
F I G. 14 B
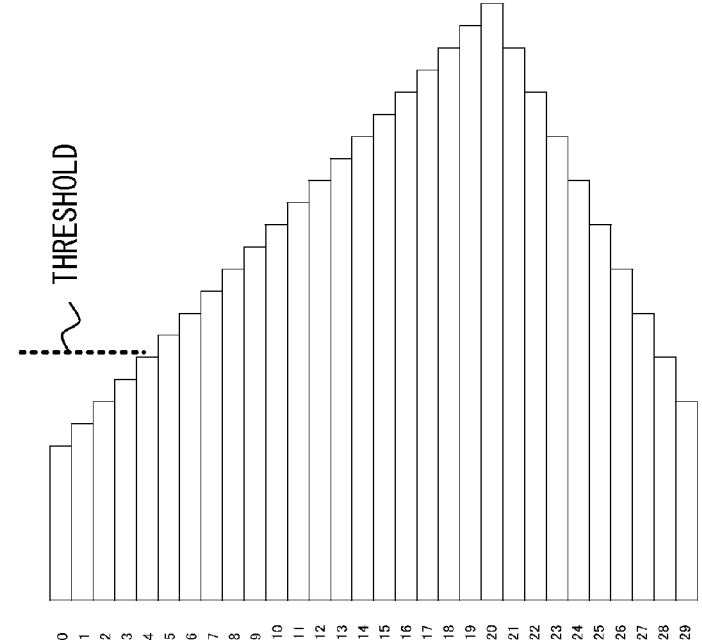
FREQUENCY OF AMPLITUDE 0 ≦ FREQUENCY
THRESHOLD OF AMPLITUDE 0
(NORMAL CONVERGENCE)
F I G. 14 A

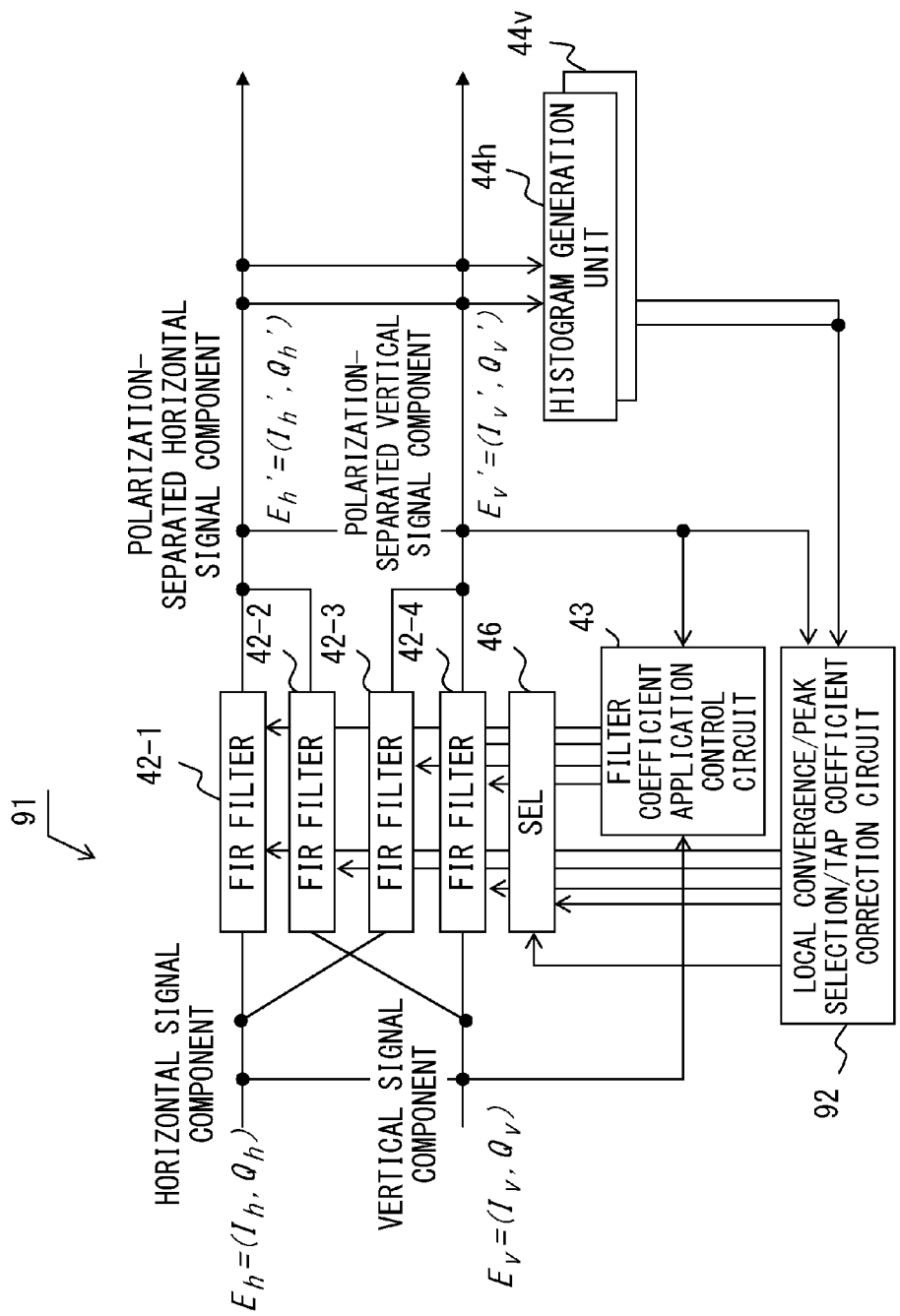
F I G . 17

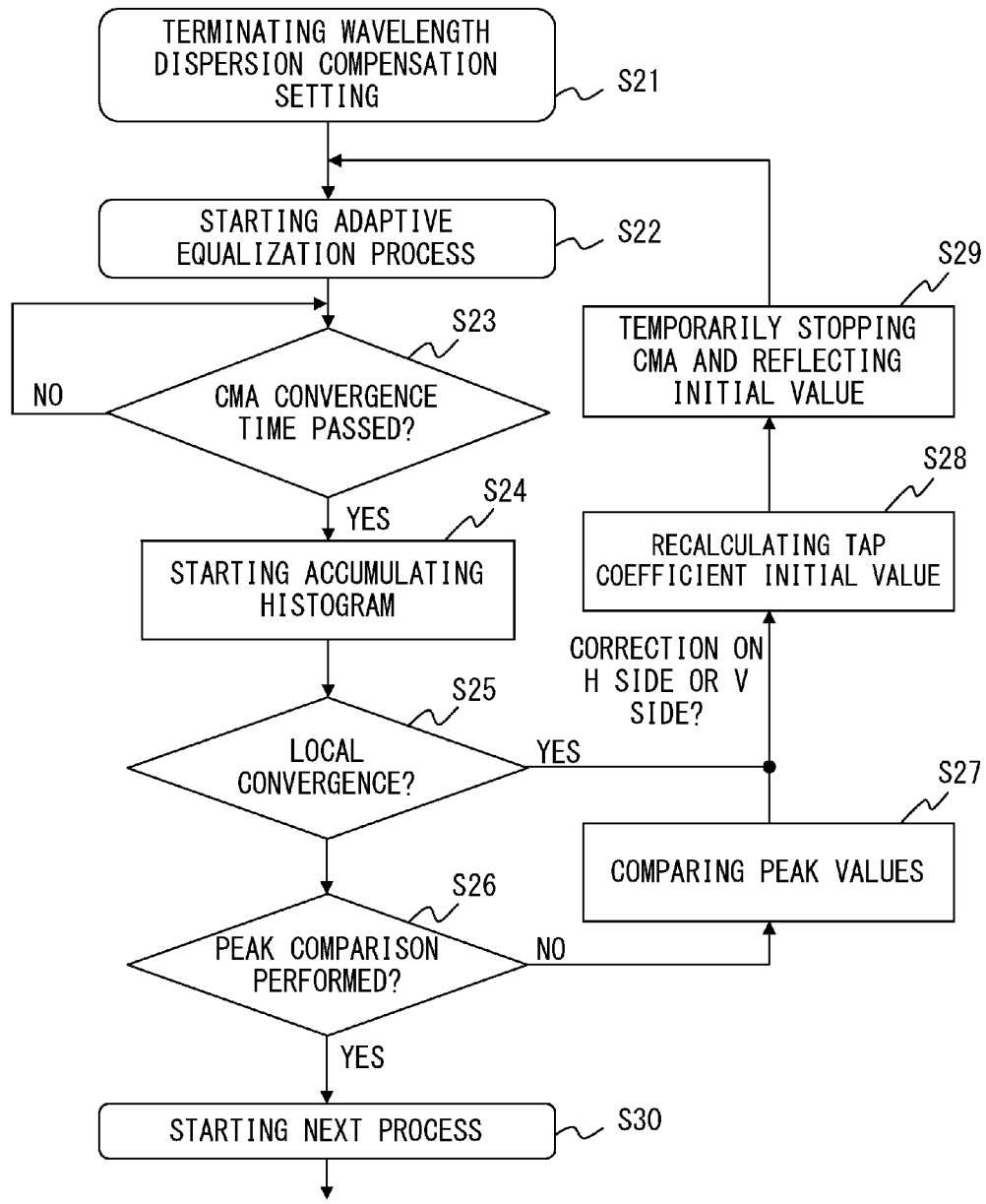
F I G. 19

DIGITAL COHERENT OPTICAL RECEIVER, ADAPTIVE EQUALIZER, AND DIGITAL COHERENT OPTICAL COMMUNICATION METHOD

CROSS-REFERENCE TO RELATED APPLICATIONS

This application is based upon and claims the benefit of priority of the prior Japanese Patent Application No. 2010-274933, filed on Dec. 9, 2010, the entire contents of which are incorporated herein by reference.

FIELD

The present invention relates to a digital coherent optical receiver, an adaptive equalizer, and a digital coherent optical communication method.

BACKGROUND

In the ultrahigh-speed communication at 40 Gbps and 100 Gbps, there is the problems of an insufficient optical signal-to-noise ratio (OSNR) and a linearity distortion of wavelength dispersion etc. The digital coherent reception system using an analog-to-digital converter has attracted considerable attention as a solution for the problems.

Used in the transmission at 100 Gbps or higher is polarization orthogonal modulation for modulating data independent of the polarization having vertical polarization orthogonal to horizontal polarization. Since the polarization state in optical fiber may cause a high-speed polarization fluctuation at 10 KHz or higher, it is necessary for a reception unit to perform high-speed polarization control for separating a vertical polarization signal and a horizontal polarization signal while following the high-speed polarization fluctuation. The adaptive equalizer is used for high-speed polarization control.

FIG. 1 illustrates an example of an adaptive equalizer 11. The adaptive equalizer 11 has four FIR (finite impulse response) filters 12-1 through 12-4 and a filter coefficient application control circuit 13.

In FIG. 1, a horizontal signal component Eh=(Ih, Qh) and a vertical signal component Ev=(Iv, Qv) on the input side of the adaptive equalizer 11 are signals including polarization fluctuation components. A horizontal signal component Eh'=(Ih', Qh') and a vertical signal component Ev'=(Iv', Qv') on the output side are polarization-separated signals.

Each of the FIR filters 12-1 and 12-2 receives the horizontal signal component Eh=(Ih, Qh) and the vertical signal component Ev=(Iv, Qv), and a signal obtained by combining the components is output as a vertical signal component E'v=(I'v, Q'v).

The filter coefficient application control circuit 13 controls the tap coefficient and the combination ratio of the four FIR filters 12-1 through 12-4.

The above-mentioned adaptive equalizer 11 can adaptively update the tap coefficient and the combination ratio of the FIR filters in real time in an update time sufficiently higher than the polarization fluctuation of optical fiber, thereby realizing a stable reception state against the fluctuation of the polarization state and the PMD. The PMD refers to polarization mode dispersion.

Proposed as adaptive equalization methods for the adaptive equalizer are a method using a training symbol, decision directed-least mean squares (DD-LMS), a constant modulus algorithm (CMA method) method, etc. The CMA method is a type of blind equalization not requiring a training symbol, and a method of controlling the tap coefficient of a filter so that the peak power of a signal after the adaptive equalization can be constant. The CMA method has a merit of having a simpler circuit than the method of using a training symbol and the DD-LMS, and being capable of converging independent of a tap coefficient initial value.

FIG. 2 is a configuration of an adaptive equalizer using the CMA method. An adaptive equalizer 21 has four FIR filters 22-1 through 22-4 and a filter coefficient application control circuit 23. The tap coefficient of the FIR filter 22-1 is expressed as $h_{hh}$, the tap coefficient of the FIR filter 22-2 is expressed as $h_{vh}$, the tap coefficient of the FIR filter 22-3 is expressed as $h_{hv}$, and the tap coefficient of the FIR filter 22-4 is expressed as $h_{vv}$.

The update equation of the tap coefficient of the filter in the CMA method is expressed as follows.

$$H(n+1)=H(n)-\mu \cdot rn^*(|yn|^2-\gamma)yn \quad rn^*=(Eh^*,Ev^*)= \\ ((Ih,-Qh),(Iv,-Qv))\text{: FIR input signal} \\ yn=(Eh',Ev')\text{: FIR output signal}$$

H (n): tap coefficient, γ: target amplitude constant

The filter coefficient application control circuit 23 controls the tap coefficient of the filter so that the peak power of the signal can be constant by the equation above.

When the digital signal processing exceeding 100 Gbps is realized using the CMOS circuit, a number (for example, more than 500 lanes) of circuits are provided in parallel, some of which are selected and fed back. In this case, depending on the initial value of the tap coefficient of a FIR filter, the FIR filter may converge to a local minimum solution, and a waveform may not be correctly formed.

FIG. 3 illustrates the constellations on the horizontal polarization side and the vertical polarization side. As illustrated in FIG. 3, the constellation on the horizontal (H) polarization side converges around the center, and the horizontally polarization side converges to a local minimum solution.

To detect the convergence to a local minimum solution using a forward error correction (FEC) counter etc., it is necessary to complete the extraction of a frame by terminating the processes of a local emission frequency offset estimation unit, a carrier wave phase estimation unit, a determination unit, a frame synchronization unit, etc. Therefore, there has been the problem that it takes a long time to detect the convergence to a local minimum solution (hereafter referred to as a local convergence).

In addition, there has been the problem with the CMA method that the uniquness of a convergent solution is not guaranteed. That is, with the adaptive equalizer using the CMA method, there are cases in which a horizontal polarization signal and a vertical polarization signal can be separated into two different signals, and in which the same polarization signal is output separated into a horizontal polarization signal and a vertical polarization signal.

To solve the above-mentioned problem in the CMA method, the logarithm partial differentiation value of the target probability density function of a separation output signal of a polarization separator for polarization-separating an input signal is calculated, and based on the logarithm polarization differentiation value, the inclination of the target optimum function for optimizing the distribution of a multiple output signal is calculated. Furthermore, the technology of avoiding the equivalence convergence by updating the coefficient of a filter based on the inclination obtained by the calculation is known (for example, patent document 1).

In addition, a technology of calculating one tap coefficient of a FIR filter, which outputs a horizontal polarization signal or a vertical polarization signal, from another tap coefficient is known. Even when equivalence convergence occurs, the equivalence convergence can be avoided by regenerating a tap coefficient (for example, non-patent document 1).

DOCUMENT OF PRIOR ART

Patent Document

[Patent Document 1] Japanese Laid-open Patent Publication No. 2009-296596

Non-Patent Document

[Non-patent Document 1] Initial Tap Setup of Constant Modulus Algorithm for Polarization De-multiplexing in Optical Coherent Receivers: L. Liu, Zhenning Tao, Weizhen Yan, Shoichiro Oda, Takeshi Hoshida, Jens C. Rasmussen: OFC/NFOEC' 2009, paper OMT2, 2009

SUMMARY

The digital coherent optical receiver includes a processor that is operative to separate electric signals obtained by converting an optical signal into a horizontal signal component and a vertical signal component; to generate a histogram of the horizontal signal component and the vertical signal component as outputs of the equalizing filter; and to determine a presence/absence of local convergence based on distribution of the histogram of the horizontal signal component and the histogram of the vertical signal component.

The digital coherent optical receiver disclosed by the present invention shortens the time required in determining local convergence.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates the adaptive equalizer according to the first embodiment;
FIG. 6 illustrates an example of a histogram;
FIG. 7 is a flowchart of the operation of the adaptive equalizer according to the first embodiment;
FIGS. 10A and 10B are explanatory views of the first local convergence determining method;
FIG. 11 illustrates the configuration of the local convergence determination circuit in the second local convergence determining method;
FIGS. 12A and 12B are explanatory views of the second local convergence determining method;

FIG. 13 illustrates the configuration of the local convergence determination circuit in the third local convergence determining method;
FIGS. 14A and 14B are explanatory views of the third local convergence determining method;
FIG. 17 illustrates the configuration of the adaptive equalizer according to the second embodiment;
FIG. 19 is a flowchart of the operation of the adaptive equalizer according to the second embodiment.

DESCRIPTION OF EMBODIMENTS

Figure 4:
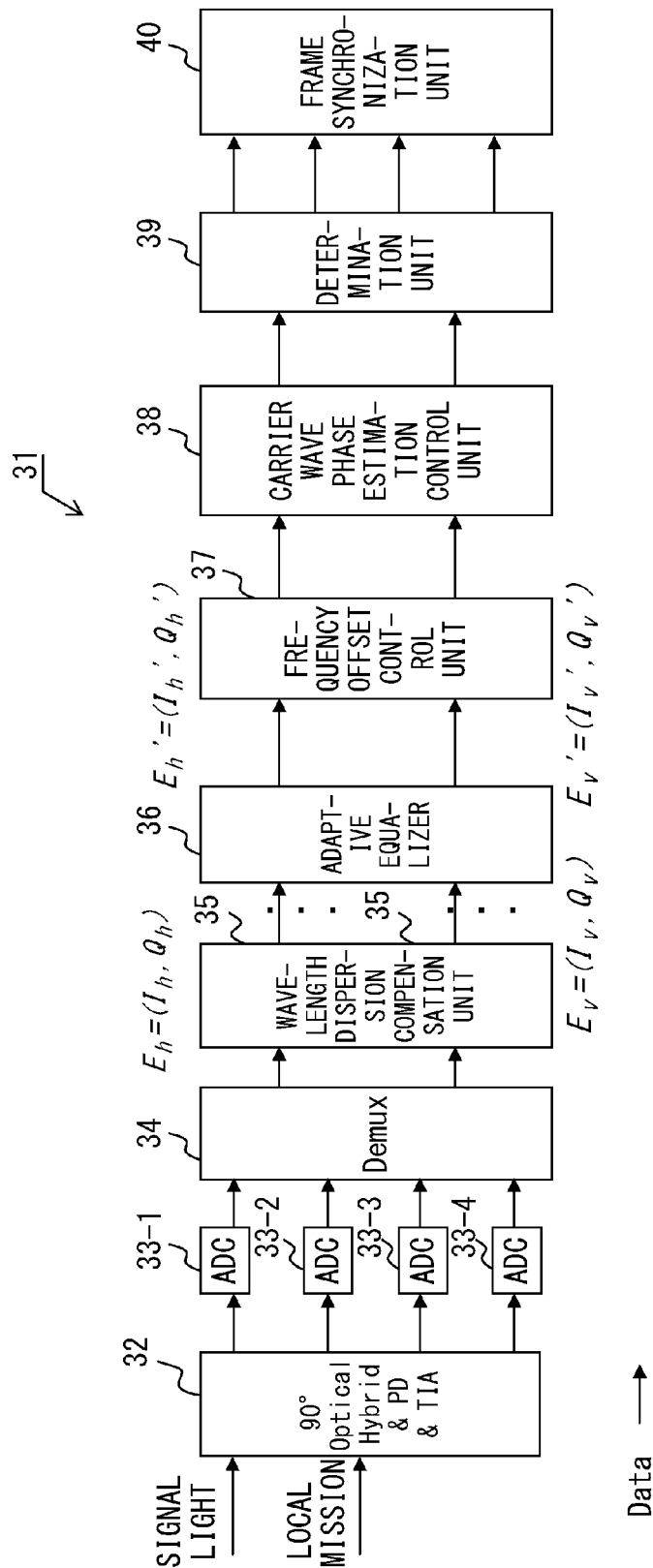
FIG. 4 illustrates the configuration of the digital coherent optical receiver.

FIG. 4 is an example of the configuration of the digital coherent optical receiver. A digital coherent optical receiver 31 has a 90° hybrid circuit 32, analog-to-digital converters (ADC) 33-1 through 33-4, a Demux unit 34, a wavelength dispersion compensation unit 35, and an adaptive equalizer 36. The digital coherent optical receiver 31 includes a frequency offset control unit 37, a carrier wave phase estimation control unit 38, a determination unit 39, and a frame synchronization unit 40. The analog-to-digital converters 33-1 through 33-4, the Demux unit 34, the wavelength dispersion compensation unit 35, the adaptive equalizer 36, etc. can be realized by a hardware circuit such as a CMOSIC etc. The wavelength dispersion compensation unit 35, the adaptive equalizer 36, the frequency offset control unit 37, the carrier wave phase estimation control unit 38 etc. can be realized by a digital signal processor.

The 90° hybrid circuit 32 has an opto-electric conversion function, and a current-voltage conversion function (transimpedance amplifier (TIA)). The 90° hybrid circuit 32 extracts from signal light using local emission an optical signal having a 90° phase difference with respect to the optical signal which is in phase with the local emission, converts the extracted optical signal into an electric signal, and separates the signal into an I component and a Q component.

Analog-to-digital converters 13-1 through 13-4 sample an analog signal output from the 90° hybrid circuit 32 with the timing synchronous with a clock signal and converts it into a digital signal.

The Demux unit 34 spreads in parallel the I component and the Q component of a signal so that the signal can be processed in parallel in a plurality of circuits in the subsequent stage. The Demux unit 34 and the subsequent circuits are provided with a circuit having a plurality of lanes to parallel-spread the I component and the Q component of a signal, or to process a parallel-spread signal.

The wavelength dispersion compensation unit 35 compensates for the wavelength dispersion of the horizontal signal component Eh=(Ih, Qh) and the vertical signal component Ev=(Iv, Qv) including the polarization component output from the Demux unit 34.

The adaptive equalizer 36 adaptively updates the tap coefficient of a filter, and outputs the horizontal signal component Eh'=(Ih', Qh') and the vertical signal component Eh'=(Iv', Qh') by separating the polarization component. The adaptive equalizer 36 has a plurality of circuits for processing the I components and the Q components of the parallel-spread signal.

The frequency offset control unit 37 compensates for the frequency offset of the local emission on the transmission and reception sides. The carrier wave phase estimation control unit 38 estimates and compensates for the phase difference of the carrier wave.

The determination unit 39 demodulates the data by determining the signal point on the I an Q planes. The frame synchronization unit 40 constructs the demodulated data into a frame in a determined format.

The digital coherent optical receiver 31 can use a circuit of another well known configuration not limited to the circuit in the above-mentioned configuration.

FIG. 5 illustrates the configuration of the adaptive equalizer 36 according to the first embodiment. The adaptive equalizer 36 includes four FIR filters 42-1 through 42-4, a filter coefficient application control circuit 43, two histogram generation units 44$h$ and 44$v$, a local convergence determination and tap coefficient correction circuit 45, and a selection circuit (SEL) 46.

The FIR filters 42-1 through 42-3 receive the horizontal signal component Eh=(Ih, Qh) including the polarization component. The FIR filters 42-2 through 42-4 receive the vertical signal component Ev=(Iv, Qv) including the polarization component.

The tap coefficient of the FIR filters 42-1 through 42-4 is corrected by the filter coefficient application control circuit 43 or the local convergence determination and tap coefficient correction circuit 45. As a result, a polarization-separated horizontal signal component Eh'=(Ih', Qh') is obtained as a signal obtained by combining the outputs of the FIR filters 42-1 and 42-2. Similarly, the polarization-separated vertical signal component Ev'=(Iv', Qv') is obtained as a signal obtained by combining the outputs of the FIR filter 42-3 and 42-4.

The filter coefficient application control circuit 43 outputs an updated tap coefficient to the selection circuit 46 based on the horizontal signal component Eh and vertical signal component Ev including the polarization components and the polarization-separated horizontal signal component Eh' and vertical signal component Ev'. The filter coefficient application control circuit 43 is an example of a filter calculation circuit.

The histogram generation unit 44$h$ determines where the amplitude value (for example, a sum of squares of the I and Q components of a signal) of the horizontal signal component Eh' is located in the range which is delimited at equal intervals between 0 and a certain value (maximum value), and generates a histogram having the amplitude value of the horizontal signal component Eh'.

Hereafter in the present embodiment, the sum of squares (($P=I^2+Q^2$)) of the I and Q components of each signal of the horizontal and vertical signal components is referred to as an amplitude value of the signal.

The histogram generation unit 44$v$ determines where the amplitude value of the vertical signal component Ev' is located in the range which is delimited at equal intervals between 0 and a certain value (maximum value), and generates a histogram having the amplitude value of the vertical signal component Ev'. The data of the generated histogram of the horizontal signal component Eh' and the vertical signal component Ev' is output to the local convergence determination and tap coefficient correction circuit 45.

FIG. 6 is an example of a histogram generated by the histogram generation units 44$h$ and 44$v$. In this example, the maximum value of the signal amplitude is equally divided into 30 steps from INDEX_0 to INDEX_29 to generate a histogram. For example, INDEX_0 corresponds to the amplitude of "0", and INDEX_29 corresponds to the maximum value of the amplitude through the value of 29/39 of the maximum value.

The histogram generation units 44$h$ and 44$v$ in FIG. 5 determine to which value in the range of INDEX_0 through INDEX_29 the amplitude value of the horizontal signal component and the vertical signal component corresponds, accumulate the number of pieces of data of the corresponding amplitude value, and generate a histogram.

The local convergence determination and tap coefficient correction circuit 45 determines the presence/absence of local convergence based on the distribution of the histogram generated by the histogram generation units 44$h$ and 44$v$ or the position of the peak value. Then, when it is determined that the local convergence exists in the horizontal signal component or the vertical signal component, a switch signal directing a selection switch is output to the selection circuit 46, and the tap coefficient on the normal convergence side is output as an initial value of the tap coefficient.

The selection circuit 46 normally selects the tap coefficient output from the filter coefficient application control circuit 43, and outputs it to the FIR filters 42-1 through 42-4. Upon receipt of the switch signal from the local convergence determination and tap coefficient correction circuit 45, the circuit selects the tap coefficient output from the local convergence determination and tap coefficient correction circuit 45, and outputs it to the FIR filters 42-1 through 42-4. Thus, when the local convergence is detected, the tap coefficient on the side on which no local convergence has occurred is output from the selection circuit 46 as an initial value of the tap coefficient on the side on which the local convergence has occurred.

FIG. 7 is a flowchart of the operation of the adaptive equalizer according to the first embodiment.

When a wavelength dispersion compensation setting process by the wavelength dispersion compensation unit 35 is completed (S11), an adaptive equalization process is started by the adaptive equalizer 36 (S12). In the adaptive equalization process in step S12, the tap coefficient of the FIR filters 42-1 through 42-4 is updated using the tap coefficient output from the filter coefficient application control circuit 43 or the local convergence determination and tap coefficient correction circuit 45.

Next, it is determined whether or not a CMA convergence time has passed (S13). The CMA convergence time is determined in advance to determine the local convergence.

If the CMA convergence time has passed (YES in S13), a monitor start notification is output, and a histogram accumulating process in step S14 is performed. In the process in step S14, for example, histogram generation units 44-1 and 44-2 start accumulating a histogram.

When a monitor completion notification is output, it is determined using the histogram whether or not the local convergence exists (S15). In the process in step S15, for example, the local convergence determination and tap coefficient correction circuit 45 determines the presence/absence of the local convergence based on the histogram generated by the histogram generation units 44$h$ and 44$v$.

If it is determined that there is local convergence (YES in S15), control is passed to step S16, and the initial value of the tap coefficient is recalculated. In the process in step S16, for example, the local convergence determination and tap coefficient correction circuit 45 calculates the initial value of the tap coefficient on the side on which the local convergence has occurred using the tap coefficient on the side on which no local convergence has occurred (horizontal signal component or vertical signal component).

Next, the CMA using the tap coefficient used up to the point is temporarily stopped, and the tap coefficient on the side on which the local convergence has occurred is changed to the initial value recalculated in step S16 (S17). In the process in step S17, for example, the local convergence determination and tap coefficient correction circuit 45 directs the selection circuit 46 to switch the tap coefficient on the side on which the local convergence has occurred. Thus, the selection circuit 46 outputs the initial value of the tap coefficient output from the local convergence determination and tap coefficient correction circuit 45 to the FIR filter on the side on which the local convergence has been detected.

When no local convergence is detected (NO in S15), control is passed to step S18, and the process in the next stage is started. The process in the next stage refers to, for example, a frequency offset compensating process etc. by the frequency offset control unit 37.

Figure 8:
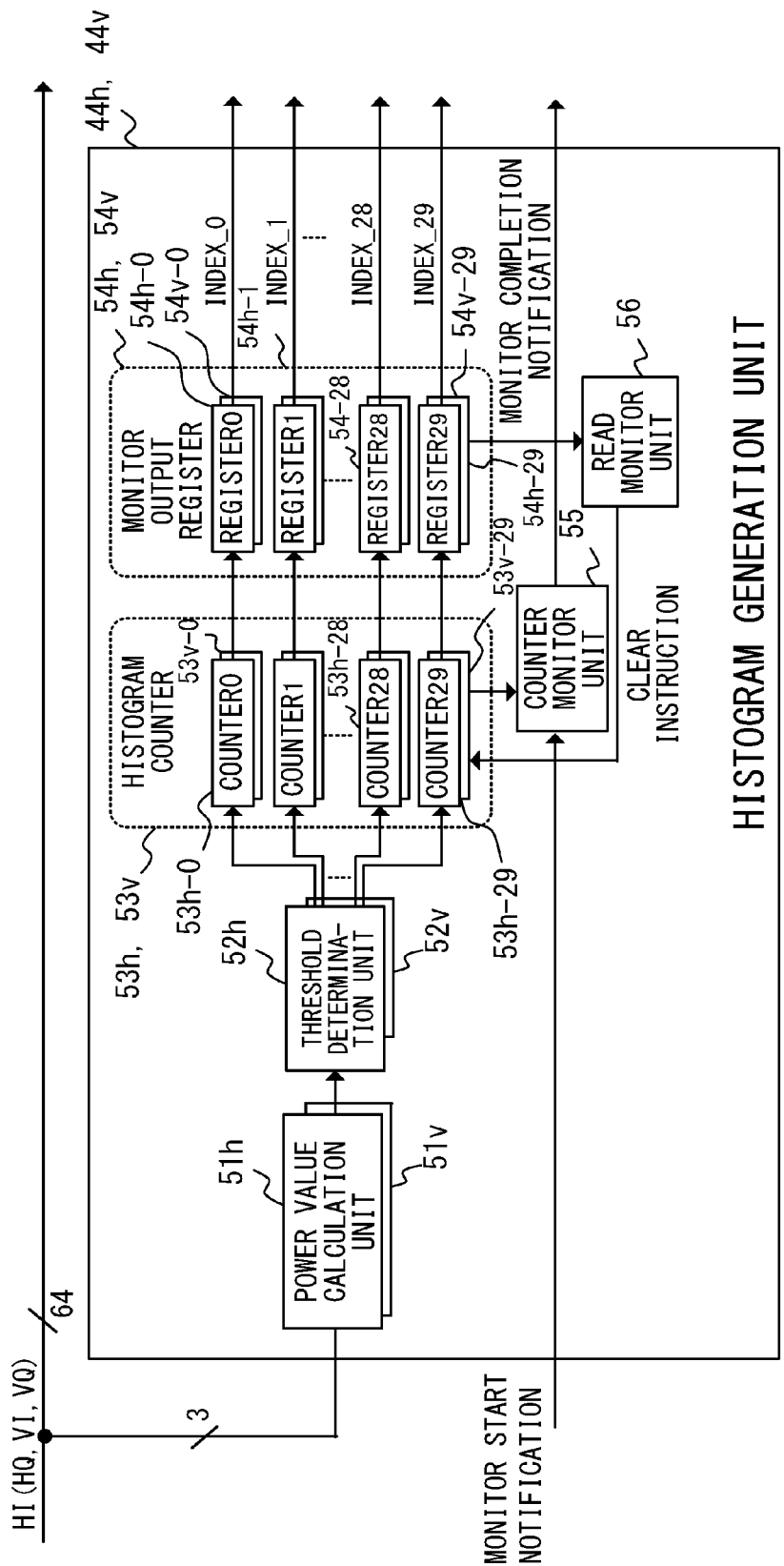
FIG. 8 illustrates the configuration of a histogram generation unit.

FIG. 8 illustrates the configuration of the histogram generation units 44$h$ and 44$v$. It is not necessary to generate a histogram in all adaptive equalizers 36 in a plurality of lanes, but a histogram may be generated in an arbitrary number of lanes. Then, using the generated histograms, the tap coefficient of another lane may be corrected. The example in FIG. 8 refers to a case in which the histogram generation units 44$h$ and 44$v$ are provided for 3 lanes when the adaptive equalizers 36 are provided for 64 lanes.

In FIG. 8, each of the histogram generation units 44$h$ and 44$v$ includes power value calculation units 51$h$ and 51$v$, threshold determination units 52$h$ and 52$v$, histogram counters 53$h$ and 53$v$, and monitor output counters 54$h$ and 54$v$. The histogram generation units 44$h$ and 44$v$ have a counter monitor unit 55 and a read monitor unit 56.

The character h of the reference numeral of each circuit refers to a circuit for a horizontal signal component, and the character v refers to a circuit for a vertical signal component.

The power value calculation unit 51$h$ for a horizontal signal component calculates a sum of the value $HI^2$ obtained by squaring the I component of the horizontal signal component Eh and the value $HQ^2$ obtained by squaring the Q component as a power value (amplitude value) of the horizontal signal component Eh.

The power value calculation unit 51$v$ for a vertical signal component calculates a sum of the value $VI^2$ obtained by squaring the I component of the vertical signal component Ev and the value $VQ^2$ obtained by squaring the Q component as a power value (amplitude value) of the vertical signal component.

The threshold determination unit 52$h$ for a horizontal signal component compares the amplitude value calculated by the power value calculation unit 51$h$ with the threshold of each section of the histogram, and determines to which section the amplitude value corresponds. Then, the unit outputs to the histogram counter 53$h$ for the corresponding section a signal for increment of the count value.

The histogram counter 53$h$ for a horizontal signal component includes 30 histogram counters 53$h$-0 through 53$h$-29 corresponding to the number of sections (for example, 30) of the histogram. The histogram counter 53$v$ for a vertical signal component also includes 30 histogram counters 53$v$-0 through 53$v$-29 corresponding to the number of histograms.

The monitor output register 54$h$ for a horizontal signal component includes a plurality of (30 in this case) monitor output registers 54$h$-0 through 54$h$-29 corresponding to the histogram counters 53$h$-0 through 53$h$-29. Each of the monitor output registers 54$h$-0 through 54$h$-29 holds the count values of the corresponding histogram counters 53$h$-0 through 53$h$-29, and outputs them as the accumulated values INDEX_0 through INDEX_29 of the horizontal signal components.

Similarly, the monitor output register 54$v$ for a vertical signal component includes a plurality of monitor output registers 54$h$-0 through 54$h$-29 corresponding to the histogram counters 53$v$-0 through 53$v$-29. Each of the monitor output registers 54$h$-0 through 54$h$-29 holds a count of a corresponding histogram counters 53$v$-0 through 53$v$-29, and outputs them as accumulated values of INDEX_0 through INDEX_29 for vertical signal components.

Upon receipt of the monitor start notification, the counter monitor unit 55 starts monitoring the histogram counters 53$h$ and 53$v$. When any count value of the histogram counters 53$h$-0 through 53$h$-29 reaches the upper limit or when the total count value of all counters reaches the upper limit of the number of monitor accumulation, the counter monitor unit 55 outputs the monitor completion notification.

Upon receipt of the monitor completion notification from the counter monitor unit 55, the local convergence determination and tap coefficient correction circuit 45 reads the accumulated value of the monitor output registers 54$h$ and 54$v$, and generates a histogram of the horizontal signal component and the vertical signal component.

The read monitor unit 56 monitors whether or not a read of the accumulated value of the monitor output registers 54$h$ and 54$v$ has been performed, and if the accumulated value has been read by the local convergence determination and tap coefficient correction circuit 45, the unit clears the histogram counters 53$h$ and 53$v$.

Described next is the local convergence determining operation by the local convergence determination and tap coefficient correction circuit 45.

Described first is the method (hereafter referred to as a first local convergence determining method) for determining the local convergence by comparing the number of pieces of data of amplitude values larger than a determination point, which is an amplitude value, with the number of pieces of data of amplitude values equal to or smaller than the determination point. It is an example of a case in which the presence/absence of the local convergence is determined based on the distribution of a histogram.

Figure 9:
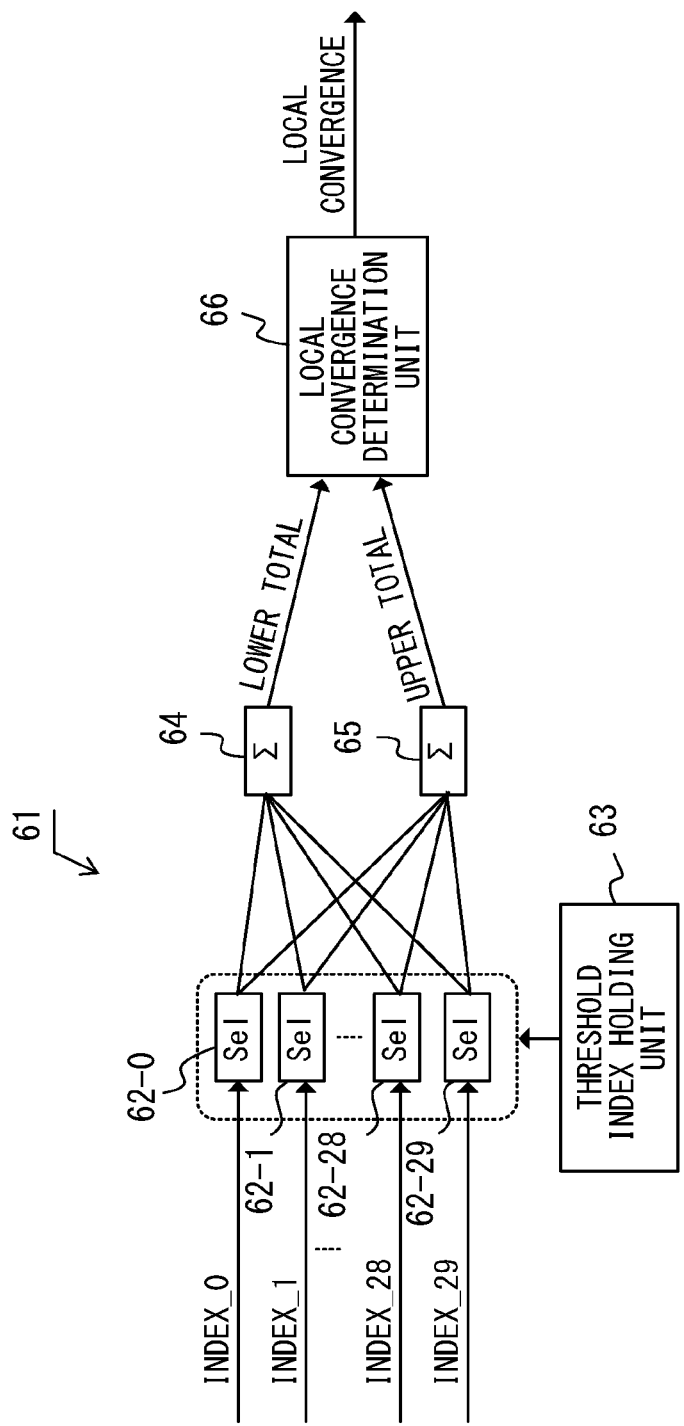
FIG. 9 illustrates the configuration of the local convergence determination circuit in the first local convergence determining method.

FIG. 9 illustrates the configuration of a local convergence determination circuit 61 by the above-mentioned first local convergence determining method.

The local convergence determination circuit 61 includes, for example, two circuits, that is, a circuit for determining the local convergence of a horizontal signal component and a circuit for determining the local convergence of a vertical signal component. The local convergence determination circuit 61 is a part of the local convergence determination and tap coefficient correction circuit 45 in FIG. 5.

In FIG. 9, the local convergence determination circuit 61 includes 30 selectors 62-0 through 62-29 for switching the destination of the accumulated values INDEX_0 through INDEX_29 based on the value (for example, a reference value) of the threshold Index, and a threshold index holding unit 63 for holding the threshold Index. The local convergence determination circuit 61 also includes a lower total calculation unit 64 for calculating a lower total value by adding the accumulated values (number of pieces of data) of the amplitude value equal to or smaller than the threshold Index, and an upper total calculation unit 65 for calculating an upper total value by adding the accumulated values of the amplitude value larger than the threshold Index. Furthermore, the local convergence determination circuit 61 includes a local convergence determination unit 66 for comparing the lower total value with the upper total value to determine the presence/absence of the local convergence.

The threshold index holding unit 63 holds the INDEX value as the boundary between the upper side and the lower side of INDEX_0 through INDEX_29.

The selectors 62-0 through 62-29 compares the threshold Index held in the threshold index holding unit 63 with any INDEX number in INDEX_0 through INDEX_29. When the INDEX number is equal to or smaller than the threshold Index, the accumulated value is output to the lower total calculation unit 64. When the INDEX number A is larger than the threshold Index, the accumulated value is output to the upper total calculation unit 65.

The lower total calculation unit 64 calculates the lower total value by adding the accumulated values output from the selectors 62-0 through 62-29. The upper total calculation unit 65 calculates the upper total value by adding the accumulated values output from the selectors 62-0 through 62-29.

The local convergence determination unit 66 compares the lower total value with the upper total value, and determines the local convergence when the lower total value is larger than the upper total value. When the lower total value is equal to or smaller than the upper total value, it is determined as normal convergence.

FIGS. 10A and 10B are explanatory views of the first local convergence determining method. The vertical axes in FIGS. 10A and 10B indicate the INDEX number corresponding to the amplitude, and the horizontal axes indicate the number of pieces of data (data frequency). The amplitude value increases in the direction indicated by the arrow in FIGS. 10A and 10B.

FIGS. 10A and 10B illustrate the case in which, for example, INDEX_15 is set as a threshold (threshold Index) as the determination criterion of the local convergence.

As illustrated in FIG. 10A, when the total of the number of pieces of data having the INDEX number equal to or smaller than the threshold (for example, INDEX_15) is equal to or smaller than the total of the number of pieces of data of INDEX equal to or exceeding the threshold, it is determined as normal convergence.

As illustrated in FIG. 10B, when the total of the number of pieces of data of INDEX smaller than the threshold is larger than the total of the number of pieces of data of INDEX equal to or exceeding the threshold, it is determined as local convergence.

Described next is the method (hereafter referred to as a second local convergence determining method) for determining the presence/absence of the local convergence depending on whether the peak value of the histogram is located on the upper side or the lower side using an amplitude value as a determination point. It is an example of a case in which the presence/absence of the local convergence is determined based on the distribution (for example, the position of the peak value) of the histogram.

FIG. 11 illustrates the configuration of a local convergence determination circuit 71 in the second local convergence determining method.

The local convergence determination circuit 71 includes a maximum data number selection unit 72, a threshold Index holding unit 73, and a threshold determination unit 74.

The maximum data number selection unit 72 specifies the INDEX number of the maximum number of pieces of data (maximum frequency Index) in the number of pieces of data of INDEX_0 through INDEX_29 output from the histogram generation units 44h and 44v, and outputs the INDEX number to the threshold determination unit 74.

The threshold Index holding unit 73 holds the threshold Index as a determination standard.

The threshold determination unit 74 compares the INDEX number of the maximum number of pieces of data output from the maximum data number selection unit 72 with the threshold Index held in the threshold Index holding unit 73, and determines whether or not the INDEX number of the maximum number of pieces of data is larger than the threshold Index. That is, it determines whether or not the amplitude value of the maximum number of pieces of data is larger than the specified amplitude value (threshold or reference value).

If the INDEX number of the maximum number of pieces of data is larger than the threshold Index, it is determined as normal convergence. That is, if the amplitude value of the maximum number of pieces of data is (equal to or) larger than a specified amplitude threshold in the histogram, it is determined as normal convergence.

On the other hand, if the INDEX number of the maximum number of pieces of data is smaller than the threshold Index, it is determined as local convergence. That is, if the amplitude value of the maximum number of pieces of data is smaller than the amplitude threshold in the histogram, it is determined as local convergence.

FIGS. 12A and 12B are explanatory views of the second local convergence determining method. The vertical axes in FIGS. 12A and 12B indicate the INDEX number corresponding to the amplitude, and the horizontal axes indicate the number of pieces of data.

FIGS. 12A and 12B are examples of the case in which, for example, INDEX_14 is set as a threshold Index.

As illustrated in FIG. 12A, when the peak value of the amplitude of the histogram is (equal to or) larger than the amplitude value of the threshold Index, it is determined as normal convergence.

On the other hand, as illustrated in FIG. 12B, when the peak value of the amplitude of the histogram is smaller than the amplitude value of the threshold Index, it is determined as local convergence.

Described next is the method (hereafter referred to as the third local convergence determining method) of determining the presence/absence of the local convergence depending on whether or not the number of pieces of data of the amplitude value 0 is larger than the threshold. It is an example of a case in which the presence/absence of the local convergence is determined based on the distribution of the histogram.

FIG. 13 illustrates the configuration of the local convergence determination circuit in the third local convergence determining method.

A local convergence determination circuit 81 includes a threshold determination unit 82 and a threshold holding unit 83. The threshold determination unit 82 compares the number of pieces of data of INDEX_0 with the threshold held in the threshold holding unit 83, and determines the presence/absence of the local convergence. The threshold determination unit 82 determines normal convergence when the number of pieces of data of INDEX_0 is equal to or smaller than the threshold. The threshold determination unit 82 determines the local convergence when the number of pieces of data of INDEX_0 is larger than the threshold.

FIGS. 14A and 14B are explanatory views of the third local convergence determining method. The vertical axes in FIGS. 14A and 14B indicate the INDEX number corresponding to the amplitude, and the horizontal axes indicate the number of pieces of data (data frequency).

As illustrated in FIG. 14A, when the number of pieces of data of INDEX_0 is equal to or smaller than the threshold, it is determined as normal convergence.

On the other hand, as illustrated in FIG. 14B, when the number of pieces of data of INDEX_0 is larger than the threshold, it is determined as local convergence.

Figure 15:
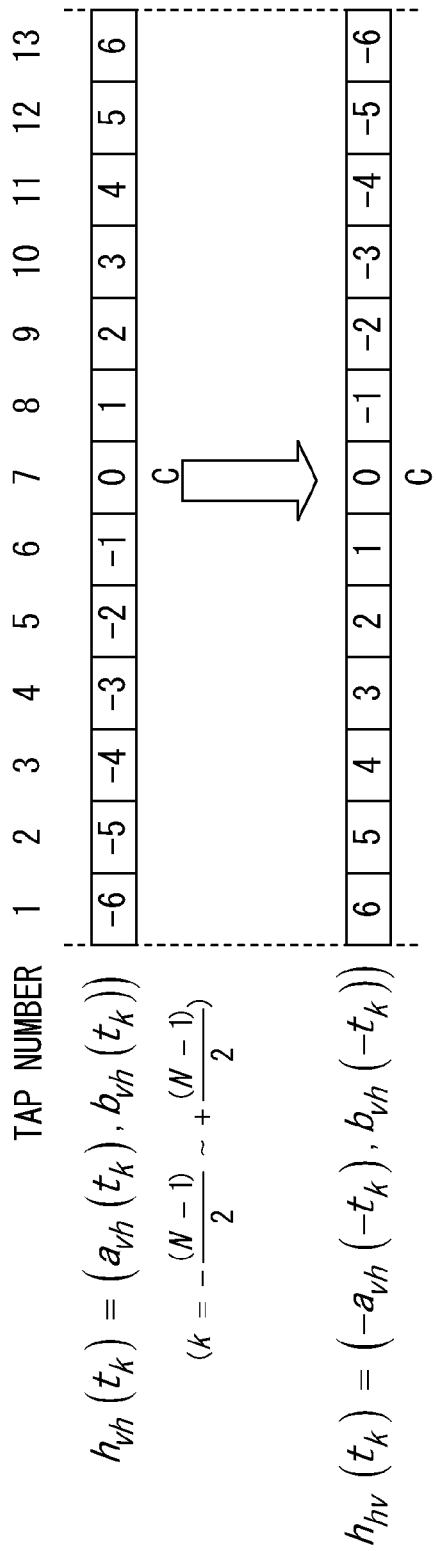
FIG. 15 is an explanatory view (1) a method of calculating a tap coefficient initial value.
Figure 16:
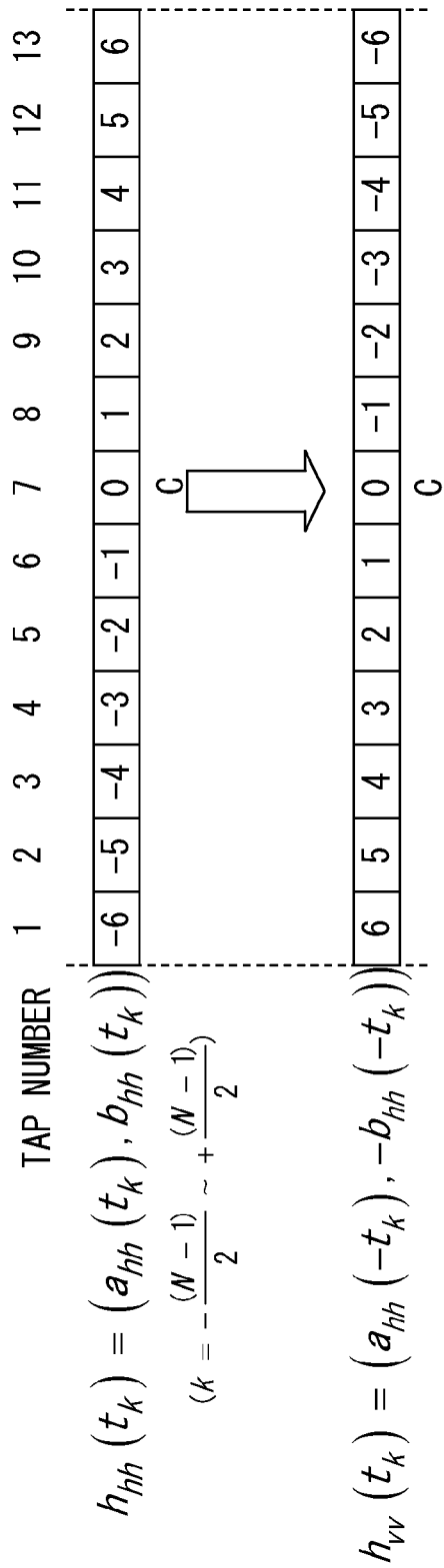
FIG. 16 is an explanatory view (2) a method of calculating a tap coefficient initial value.

Described next is the method for calculating the tap coefficient initial value when the local convergence is determined. FIGS. 15 and 16 are explanatory views of the method for calculating a tap coefficient initial value.

When the local convergence is determined, a tap coefficient initial value is set using a tap coefficient of the side on which the local convergence has not occurred.

FIG. 15 is an explanatory view (1) of the method for calculating a tap coefficient initial value, and FIG. 16 is an explanatory view (2) of the method for calculating a tap coefficient initial value.

Figure 1:
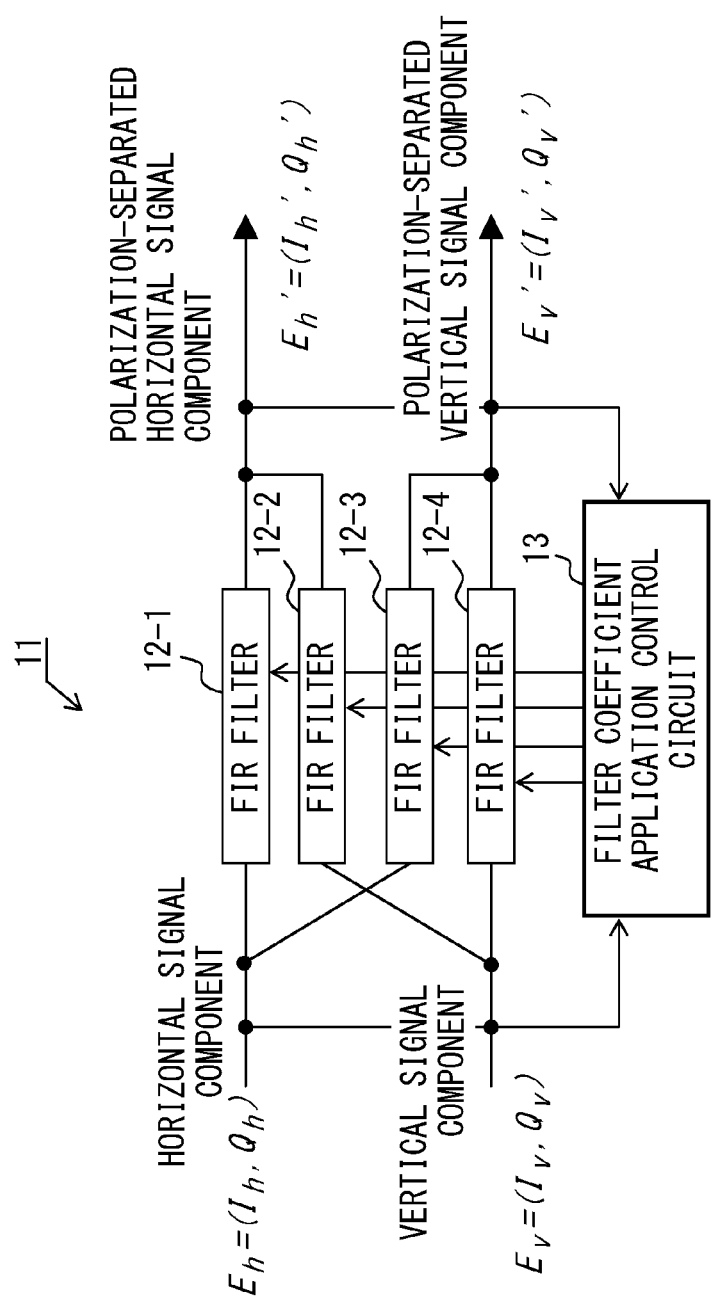
FIG. 1 illustrates an adaptive equalizer.
Figure 2:
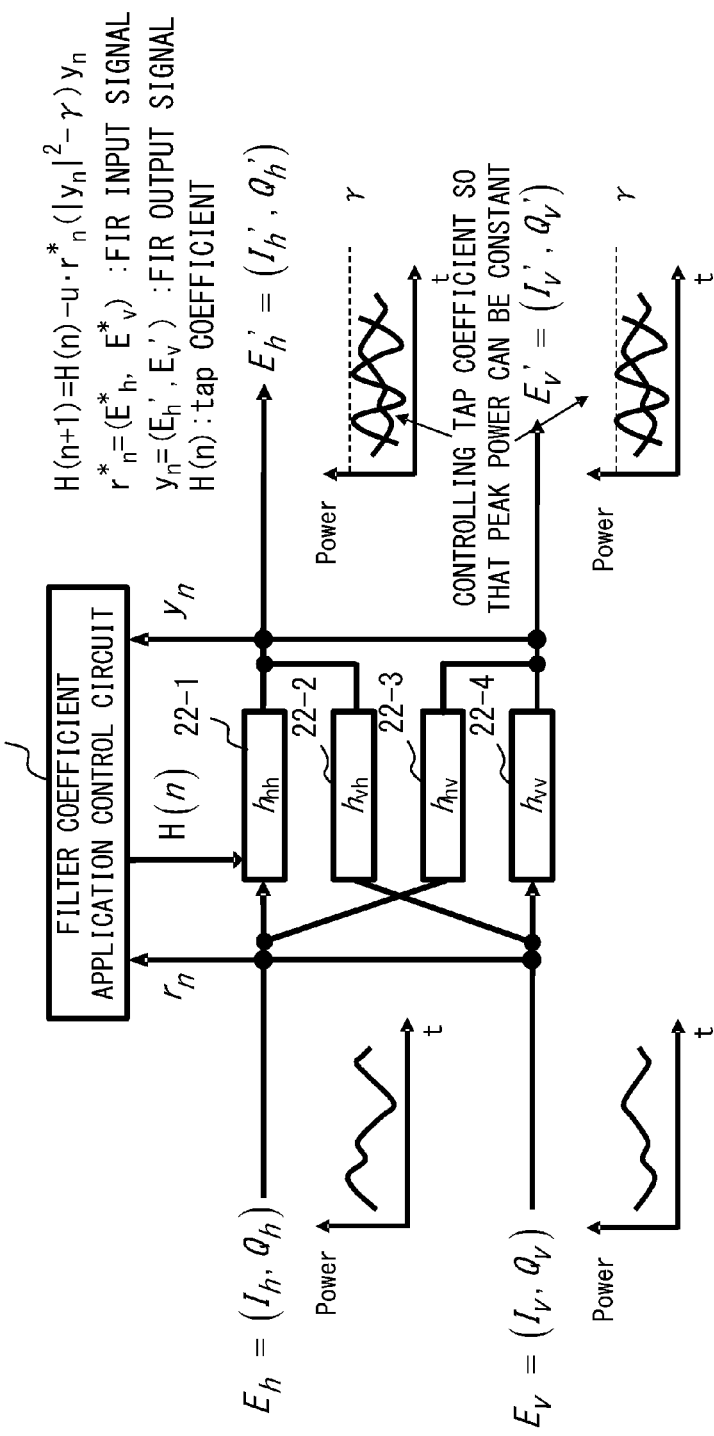
FIG. 2 illustrates the adaptive equalizer in the CMA method.
Figure 3:
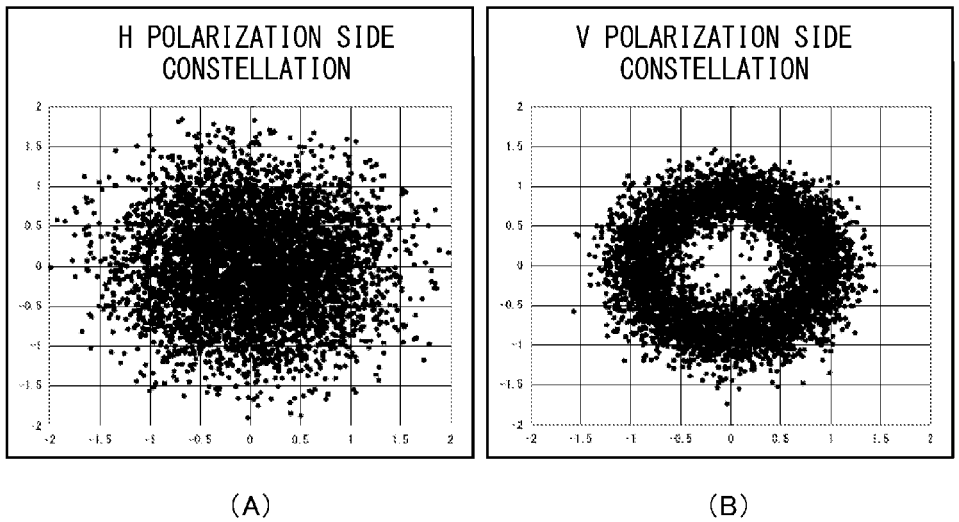
FIG. 3 illustrates the constellations on the horizontal and vertical polarization sides.

In the description below, it is assumed that the FIR filter 42-1 uses a tap coefficient $h_{hh}$, the FIR filter 42-2 uses a tap coefficient $h_{vh}$, the FIR filter 42-3 uses a tap coefficient $h_{hv}$, and the FIR filter 42-4 uses a tap coefficient $h_{vv}$. The relationship between the FIR filters 42-1 through 42-4 and the tap coefficients is the same as that illustrated in FIG. 2.

FIG. 15 is an example of calculating the initial value of the tap coefficient $h_{hv}$ of the FIR filter 32-3 for separating the vertical signal component from the tap coefficient $h_{vh}$ of the FIR filter 42-2 for separating the horizontal signal component when the local convergence is detected in the vertical signal component.

The tap coefficient $h_{vh}$ of the FIR filter 42-2 on the horizontal side indicating the normal convergence can be expressed by $(t_k)=(a_{vh}(t_k), b_{vh}(t_k))$.

The tap coefficient $h_{hv}$ of the FIR filter 42-3 on the vertical side indicating the local convergence can be calculated by the following equation from the tap coefficient $h_{vh}$ of the FIR filter 42-2 on the horizontal side indicating the normal convergence.

$$h_{hv}(t_k)=(a_{vh}(-t_k),b_{vh}(-t_k))$$

That is, the tap coefficient $h_{hv}(t_k)$ of the FIR filter 42-3 on the vertical side indicating the local convergence inverts the value of $t_k$ based on the tap center as a reference using the tap coefficient $h_{vh}(t_k)$ on the horizontal side, and obtains a value as a result of inverting the sign of the I component $a_{vh}$ of the data. The value $t_k$ specifies the position of the tap for the tap center.

FIG. 16 is an example of a case in which the initial value of the tap coefficient $h_{vv}$ of the FIR filter 42-4 for separating the vertical signal component from the tap coefficient $h_{hh}$ of the FIR filter 42-1 on the horizontal side is calculated.

The tap coefficient $h_{hh}$ of the FIR filter 42-1 can be expressed by $h_{hh}(t_k)=(a_{hh}(t_k), b_{hh}(t_k))$.

The tap coefficient $h_{vv}$ of the FIR filter 42-4 on the vertical side indicating the local convergence can be calculated by the following equation using the tap coefficient $h_{hh}$ of the FIR filter 42-1 on the horizontal side indicating the normal convergence.

$$h_{vv}(t_k)=(a_{hh}(-t_k),-b_{hh}(-t_k))$$

That is, the tap coefficient $h_{vv}(t_k)$ of the FIR filter 42-4 on the vertical side can be obtained by inverting the sign of the Q component $b_{hh}$ of the data after inverting the value of $t_k$ based on the tap center as a reference using the tap coefficient $h_{hh}(t_k)$ on the horizontal side.

According to the first embodiment above, the adaptive equalizer 36 determines the presence/absence of the local convergence. Therefore, the time required to make determination can be shorter than in the method of determining the local convergence after a frame is constructed by determining a signal point.

FIG. 17 illustrates the configuration of an adaptive equalizer 91 according to the second embodiment. In FIG. 17, the circuit block also illustrated in FIG. 5 is assigned the same reference numeral, and the detailed description is omitted here.

The adaptive equalizer 91 includes four FIR filters 42-1 through 42-4, the filter coefficient application control circuit 43, the histogram generation units 44h and 44v, and a local convergence/peak selection/tap coefficient correction circuit 92.

The local convergence/peak selection/tap coefficient correction circuit 92 determines the presence/absence of the local convergence using a histogram. If the local convergence has occurred, it calculates a tap coefficient on the side on which the local convergence has occurred from the tap coefficient on the side on which no local convergence has occurred. In addition, the local convergence/peak selection/tap coefficient correction circuit 92 compares the peak values of the histograms between the horizontal and vertical sides, and calculates a tap coefficient initial value on one side using a tap coefficient having a larger peak value on the other side.

Thus, the tap coefficient initial value for protection against the equivalence convergence can be set using a tap coefficient on the side having a larger peak value of signal amplitude, that is, using a tap coefficient on the side on which it is estimated that signal quality is higher.

Figure 18:
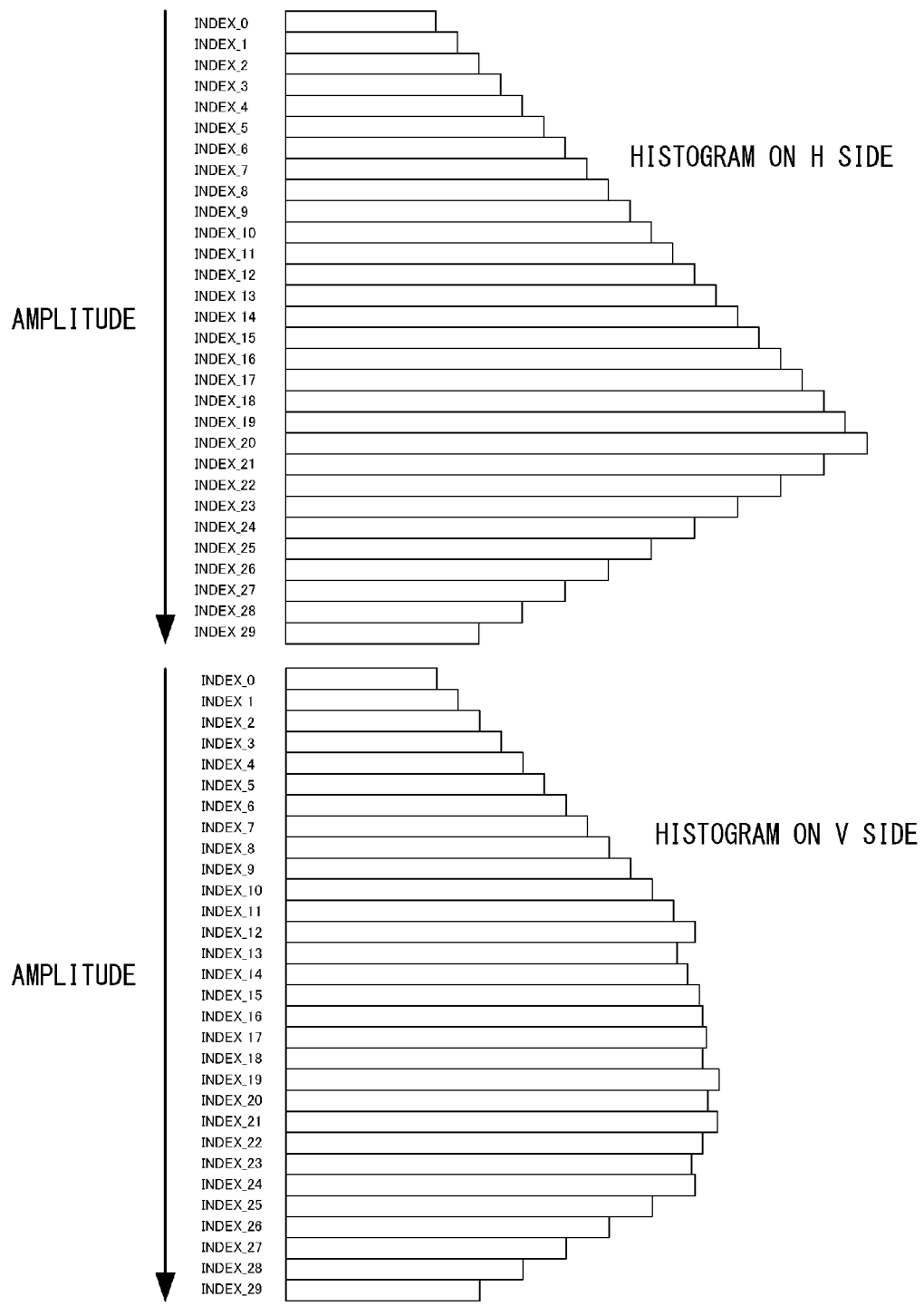
FIG. 18 illustrates the histograms on the horizontal and vertical sides.

FIG. 18 illustrates a histogram on the horizontal side and the histogram on the vertical side. In FIG. 18, the vertical axis indicates an INDEX number corresponding to the amplitude value of a signal, and the horizontal axis indicates the number of pieces of data of each INDEX.

In the example in FIG. 18, the peak value of the histogram on the horizontal side is higher than the peak value of the histogram on the vertical histogram. Therefore, the tap coefficient initial value on the vertical side is calculated using the tap coefficient on the horizontal side.

FIG. 19 is a flowchart of the operation of the adaptive equalizer 91 according to the second embodiment.

When the wavelength dispersing process is completed in the wavelength dispersion compensation unit 35 (S21), the adaptive equalization process is started (S22). Next, it is determined whether or not the convergence time of the CMA (constant modulus algorithm) has passed (S23).

If the convergence time has passed (YES in S23), control is passed to step S24, the accumulation of the histogram is started, and a histogram of a specified number of samples is generated. In the process in step S24, for example, the histogram generation units 44h and 44v generate a histogram of the horizontal signal component and the vertical signal component.

Next, it is determined whether or not the local convergence has occurred (S25). In the process in step S25, for example, the local convergence/peak selection/tap coefficient correction circuit 92 determines the presence/absence of the local convergence in the first, second, or third local convergence determining method.

When the local convergence has not occurred, control is passed to step S26, and it is determined whether or not the comparison of the peak values of the histograms has been performed between the horizontal signal component and the vertical signal component. If the local convergence is determined (YES in S25), control is passed to step S28.

If the comparison of the peak values of the histograms has not been performed (NO in S26), control is passed to step S27, and the peak values of the histograms are compared between the horizontal signal component and the vertical signal component.

Next, the tap coefficient initial value is recalculated in step S28. The recalculation of the tap coefficient initial value in step S28 is performed when the local convergence is determined in step S25 (YES in S25) or after the peak value comparing process is performed in step S27. That is, if the local convergence is determined in step S25, the tap coefficient initial value on the side on which the local convergence has occurred is calculated using the tap coefficient on the normal convergence side. If the comparison of the peak values of the histograms is performed in step S27, the tap coefficient initial value having a smaller peak value is recalculated using the tap coefficient having a larger peak value (horizontal signal component or vertical signal component).

Figure 20:
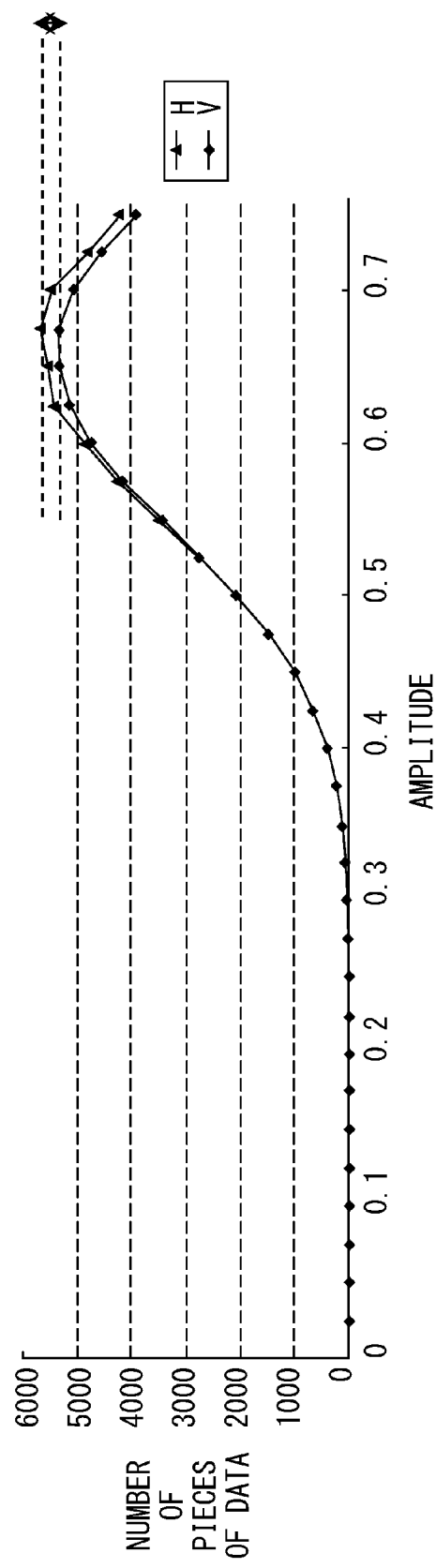
FIG. 20 is an explanatory view of the peak value of the histogram.

FIG. 20 is an explanatory view of the peak value of a histogram. The vertical axis in FIG. 20 indicates the number of pieces of data, and the horizontal axis indicates an amplitude value.

The triangular point in FIG. 20 indicates the histogram of the amplitude value of the horizontal signal component, and the square point indicates the histogram of the amplitude value of the vertical signal component. In the example in FIG. 20, since the peak value of the histogram of the horizontal signal component is larger than the peak value of the vertical signal component, the tap coefficient initial value on the vertical side is calculated using the tap coefficient on the horizontal side.

Back in FIG. 19, the CMA equalizing process is temporarily stopped in step S29, and the tap coefficient on the local convergence side is corrected using the tap coefficient initial value calculated in step S28. Then, in step S22, the adaptive equalization process is started using the corrected tap coefficient.

If it is determined in step S26 that the peak comparison has already been performed (YES in S26), control is passed to step S30, and the process in the next stage, for example, the frequency offset compensating process etc. is performed.

In the flowchart illustrated in FIG. 19, the comparison of the peak values of the histogram is performed only once, but the comparison of the peak values can be performed plural times.

Figure 21:
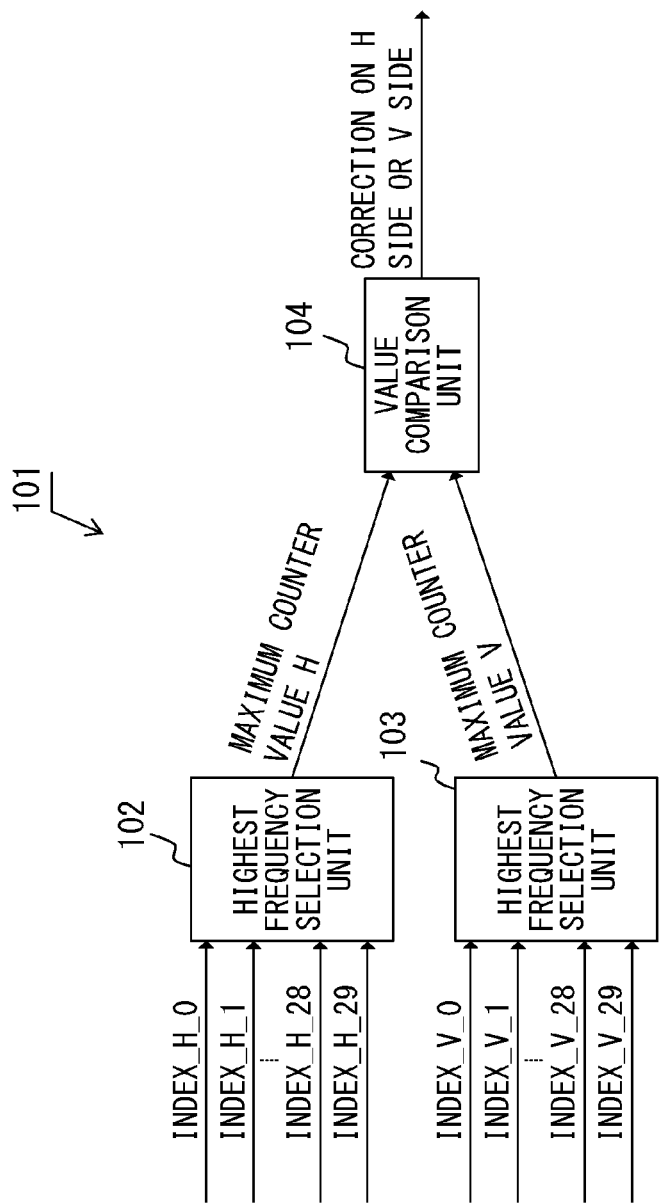
FIG. 21 illustrates a peak selection circuit.

FIG. 21 illustrates an example of a peak selection circuit 101 in the local convergence/peak selection/tap coefficient correction circuit 92.

The peak selection circuit 101 includes a highest frequency selection unit 102 for selecting the maximum value of the histogram of the horizontal signal component, a highest frequency selection unit 103 for selecting the maximum value of the histogram of the vertical signal component, and a value comparison unit 104.

The highest frequency selection unit 102 selects the peak value in INDEX_H_0 through INDEX_H_29 indicating the number of pieces of data of the amplitude value of the horizontal signal component, and outputs the selected peak value as the maximum count value H to the value comparison unit 104. INDEX_H_0 through INDEX_H_29 are output from, for example, the monitor output register 54h of the horizontal signal component in FIG. 8.

The highest frequency selection unit 102 selects the peak value in the INDEX value of INDEX_V_0 through INDEX_V_29 indicating the number of pieces of data of the amplitude value of the vertical signal component, and outputs the selected peak value as the vertical maximum count value V to the value comparison unit 104. INDEX_V_0 through INDEX_V_29 are output from the monitor output register 54v of the vertical signal component in FIG. 8.

The value comparison unit 104 compares the maximum count value H on the horizontal side with the maximum count value V on the vertical side, and specifies the smaller maximum count value as a tap coefficient to be corrected.

When the peak selection circuit 101 selects a signal to be selected, the local convergence/peak selection/tap coefficient correction circuit 92 corrects the tap coefficient of the FIR filter on the horizontal or vertical side to be corrected using the tap coefficient of the FIR filter having a larger maximum count value.

In the above-mentioned second embodiment, using a tap coefficient having a larger peak value of the histogram of the amplitude of a signal, the initial value of the other tap coefficient is calculated. Thus, using a tap coefficient of a filter which applies equalizatioin to a signal of higher signal quality, another tap coefficient can be corrected, thereby preventing the degradation of signal quality, and avoiding the equivalence convergence. Furthermore, using the above-mentioned first, second, or third local convergence determining method, the presence/absence of the local convergence can be determined in a shorter time.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples identification the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A digital coherent optical receiver, comprising:
   a converting unit configured to convert an optical signal into a horizontal signal component and a vertical signal component according to a polarization component; and
   a processor which performs a process including:
      generating a histogram of the horizontal signal component and the vertical signal component as outputs of an equalizing filter;
      correcting a first tap coefficient of the equalizing filter for a first one of the horizontal and vertical signal components using a second tap coefficient of the equalizing filter for a second one of the horizontal and vertical signal components having a higher signal quality than the first one of the horizontal and vertical signal components; and
      determining a presence/absence of local convergence in at least one of the first corrected tap coefficient and the second tap corrected coefficient of the equalizing filter based on distribution of the histogram of the horizontal signal component and the histogram of the vertical signal component.

2. The digital coherent optical receiver according to claim 1,
   wherein the process further includes comparing a peak value of the histogram of the horizontal signal component with a peak value of the histogram of the vertical signal component, and
   wherein the correcting adjusts one of the first and second tap coefficients of the equalizing filter having a smaller peak value by using another one of the first and second tap coefficients of the equalizing filter having a larger peak value.

3. The digital coherent optical receiver according to claim 2, wherein the process further includes:
selecting a peak value of a number of pieces of data of the histogram of the horizontal signal component,
selecting a peak value of a number of pieces of data of the histogram of the vertical signal component,
comparing the peak value on the horizontal side with the peak value on the vertical side, and
specifying a side having a smaller peak value as one of the first and second tap coefficients of the equalizing filter to be corrected.

4. The digital coherent optical receiver according to claim 1, wherein the process further includes:
comparing a sum of the number of pieces of data of the amplitude value of the histogram equal to or exceeding the reference value with a sum of the number of pieces of data of the amplitude value of the histogram smaller than the reference value based on an amplitude value of the horizontal or vertical signal component or a value corresponding to the amplitude value as a reference value, and
determining local convergence when the sum of the number of pieces of data smaller than the reference value is larger than the sum of the number of pieces of data equal to or exceeding the reference value.

5. The digital coherent optical receiver according to claim 4,
further comprising a storage that stores a reference value of a determination of local convergence, and
wherein the process further includes:
calculating a sum of a number of pieces of data of an amplitude value equal to or exceeding the reference value in a plurality of amplitude values of the histogram,
calculating a sum of a number of pieces of data of an amplitude value smaller than the reference value in a plurality of amplitude values of the histogram;
comparing an upper total output from the upper total calculation unit with a lower total output from the lower total calculation unit, and
determining local convergence when the lower total is larger than the upper total.

6. The digital coherent optical receiver according to claim 1, wherein the process further includes:
comparing the amplitude value of a maximum number of pieces of data of the histogram with the reference value, and
determining local convergence when the amplitude value of maximum number of pieces of data is equal to or smaller than the reference value.

7. The digital coherent optical receiver according to claim 6,
further comprising: a storage that stores a reference value as a reference of a determination of local convergence, and
wherein the process further includes:
selecting a maximum value of a number of pieces of data of each amplitude value of the histogram,
comparing the maximum value selected by the maximum value selection unit with the reference value, and
determining local convergence when the maximum value is smaller than the reference value.

8. The digital coherent optical receiver according to claim 1, wherein the process further includes
comparing a number of pieces of data of a specific amplitude value equal to or smaller than a specified value of the histogram with the reference value, and
determining local convergence when the number of pieces of data of the specific amplitude value is larger than the reference value.

9. The digital coherent optical receiver according to claim 8,
further comprising: a storage that stores the reference value as a reference of a determination of local convergence; and
wherein the process further includes
comparing a number of pieces of data of the specific amplitude value of the histogram with the reference value, and
determining the local convergence when the number of pieces of data of the specific amplitude value is larger than the reference value.

10. The digital coherent optical receiver according to claim 1, wherein the process further includes:
calculating a filter coefficient of the equalizing filter based on the horizontal signal component and the vertical signal component output from the equalizing filter,
selecting one of a filter coefficient based on distribution of the histogram of the horizontal signal component and the histogram of the vertical signal component and a filter coefficient based on the horizontal signal component and the vertical signal component output from the equalizing filter,
outputting the calculated filter coefficient to the selection circuit, and
directing switching a selection of a filter coefficient based on a determination result about the presence/absence of local convergence.

11. The digital coherent optical receiver according to claim 1, wherein the process further includes:
calculating a tap coefficient of a FIR filter on the horizontal side and a tap coefficient on the vertical side based on the horizontal signal component and the vertical signal component output from the plurality of FIR filters, and
outputting the tap coefficient on a side on which normal convergence occurs as an initial value of one of the first and second tap coefficients of the equalizing filter on a side on which the local convergence has been detected.

12. An adaptive equalizer, comprising:
an equalizing filter to separate electric signals obtained by converting an optical signal into a horizontal signal component and a vertical signal component according to a polarization component;
a histogram generation unit to generate a histogram of a horizontal signal component and a vertical signal component of an output of the equalizing filter;
a tap coefficient correction circuit to correct a first tap coefficient of the equalizing filter for a first one of the horizontal and vertical signal components using a second tap coefficient of the equalizing filter for a second one of the horizontal and vertical signal components having a higher signal quality than the first one of the horizontal and vertical signal components; and
a determination unit to determine a presence/absence of local convergence in at least one of the first corrected tap coefficient and the second corrected tap coefficient of the equalizing filter based on distribution of the histogram of the horizontal signal component and the histogram of the vertical signal component.

13. The equalizer according to claim 12, wherein the determination unit compares a peak value of the histogram of the horizontal signal component with a peak value of the histogram of the vertical signal component, and uses another one of the first and second tap coefficients of the equalizing filter having the larger peak value to correct a tap coefficient of another equalizing filter.

14. A digital coherent optical communication method comprising:
   separating electric signals obtained by converting an optical signal into a horizontal signal component and a vertical signal component according to a polarization component by an equalizing filter;
   generating a histogram of the horizontal signal component and the vertical signal component of an output of the equalizing filter;
   correcting a first tap coefficient of the equalizing filter for a first one of the horizontal and vertical signal components using a second tap coefficient of the equalizing filter for a second one of the horizontal and vertical signal components having a higher signal quality than the first one of the horizontal and vertical signal components; and
   determining a presence/absence of local convergence in at least one of the first corrected tap coefficient and the second corrected tap coefficient of the equalizing filter based on distribution of the histogram of the horizontal signal component and the histogram of the vertical signal component.

15. The method according to claim 14, further comprising comparing a peak value of the histogram of the horizontal signal component with a peak value of the histogram of the vertical signal component, and using another one of the first tap coefficient and the second tap coefficient of the equalizing filter having a larger peak value to correct a tap coefficient of the equalizing filter on a side on which the local convergence has occurred.

* * * * *

UNITED STATES PATENT AND TRADEMARK OFFICE
CERTIFICATE OF CORRECTION

PATENT NO. : 8,989,602 B2  
APPLICATION NO. : 13/283214  
DATED : March 24, 2015  
INVENTOR(S) : Kosuke Komaki et al.

Page 1 of 1

It is certified that error appears in the above-identified patent and that said Letters Patent is hereby corrected as shown below:

In the Claims

Column 14, Line 56, In Claim 1, delete "tap corrected" and insert -- corrected tap --, therefor.

Signed and Sealed this  
Twenty-third Day of June, 2015

Michelle K. Lee  
*Director of the United States Patent and Trademark Office*